United States Patent
Sjolund et al.

(10) Patent No.: US 12,458,815 B2
(45) Date of Patent: Nov. 4, 2025

(54) DOSE VOLUME HISTOGRAM OPTIMIZATION BASED ON QUANTILE REGRESSION

(71) Applicant: Elekta Instrument AB, Stockholm (SE)

(72) Inventors: Jens Olof Sjolund, Uppsala (SE); Carl Axel Håkan Nordström, Sollentuna (SE)

(73) Assignee: Elekta Instrument AB, Stockholm (SE)

( * ) Notice: Subject to any disclaimer, the term of this patent is extended or adjusted under 35 U.S.C. 154(b) by 917 days.

(21) Appl. No.: 17/651,679

(22) Filed: Feb. 18, 2022

(65) Prior Publication Data
US 2023/0264045 A1     Aug. 24, 2023

(51) Int. Cl.
    *A61N 5/10*                    (2006.01)
    *G06F 17/18*                  (2006.01)

(52) U.S. Cl.
    CPC ............ *A61N 5/1031* (2013.01); *G06F 17/18* (2013.01)

(58) Field of Classification Search
CPC ...... A61N 5/10; A61N 5/1031; A61N 5/1039; A61N 2005/1032; A61N 2005/1034; G06F 17/18
See application file for complete search history.

(56) References Cited

U.S. PATENT DOCUMENTS

| | | | | |
|---|---|---|---|---|
| 2010/0104068 | A1* | 4/2010 | Kilby | A61N 5/1031 378/65 |
| 2013/0324784 | A1* | 12/2013 | Fredriksson | A61N 5/1031 600/1 |
| 2017/0249428 | A1* | 8/2017 | Mayo | G16H 70/20 |
| 2021/0158929 | A1* | 5/2021 | Sjolund | G06N 3/045 |

OTHER PUBLICATIONS

"European Application Serial No. 23157203.3, Extended European Search Report mailed Jun. 30, 23", 6 pgs.
Agrawal, Akshay, "Differentiable Convex Optimization Layers", 33rd Conference on Neural Information Processing Systems (NeurIPS 2019), Vancouver, Canada, (2019), 13 pgs.
Boyd, Stephen, "Distributed Optimization and Statistical Learning via the Alternating Direction Method of Multipliers", Foundations and Trends in Machine Learning; 3(1), (Nov. 19, 2010), 125 pages.
Elekta, Inc., "Monaco Optimization Model: Objective Function", Focus where it matters, 9 pages.

(Continued)

*Primary Examiner* — David E Smith
(74) *Attorney, Agent, or Firm* — Schwegman Lundberg & Woessner, P.A.

(57) ABSTRACT

Dose-volume criteria may be equivalently expressed in terms of quantiles. This re-formulation of a dose-volume criteria allows incorporation of dose-volume criteria into a full optimization problem. Radiotherapy treatment techniques are described that may apply optimization-based formulation of quantiles to express dose-volume criterion as an inequality involving an optimization problem, which may improve DVH modeling, improve computational speed and accuracy of radiation treatment planning, and improve the (Continued)

delivery accuracy and efficacy of radiation doses to a patient undergoing radiotherapy treatment.

26 Claims, 10 Drawing Sheets

(56) References Cited

OTHER PUBLICATIONS

Fu, Anqi, "A Convex Optimization Approach to Radiation Treatment Planning with Dose Constraints", arXiv:1809.00744v2 [physics.med-ph], (Nov. 24, 2018), 27 pages.
Koenker, Roger, "Quantile Regression", Journal of Economic Perspectives vol. 15, No. 4, (Fall 2001), 13 pgs.
Koenker, Roger, "Quantile regression 40 years on", cemmap working paper CWP36 17, Centre for Microdata Methods and Practice (cemmap), London, (2017), 29 pgs.
Zhang, Tianfang, "Direct optimization of dose volume histogram metrics in radiation therapy treatment planning", arXiv:2109.02571v1 (physics.med ph), (Sep. 6, 2021), 23 pages.
Zinchenko, Y, "Controlling the dose distribution with gEUD-type constraints within the convex radiotherapy optimization framework", Phys. Med. Biol. 53, (May 27, 2008), 21 pgs.
"European Application Serial No. 23157203.3, Response filed Feb. 21, 2024 to Extended European Search Report mailed Jun. 30, 2023", 18 pgs.

* cited by examiner

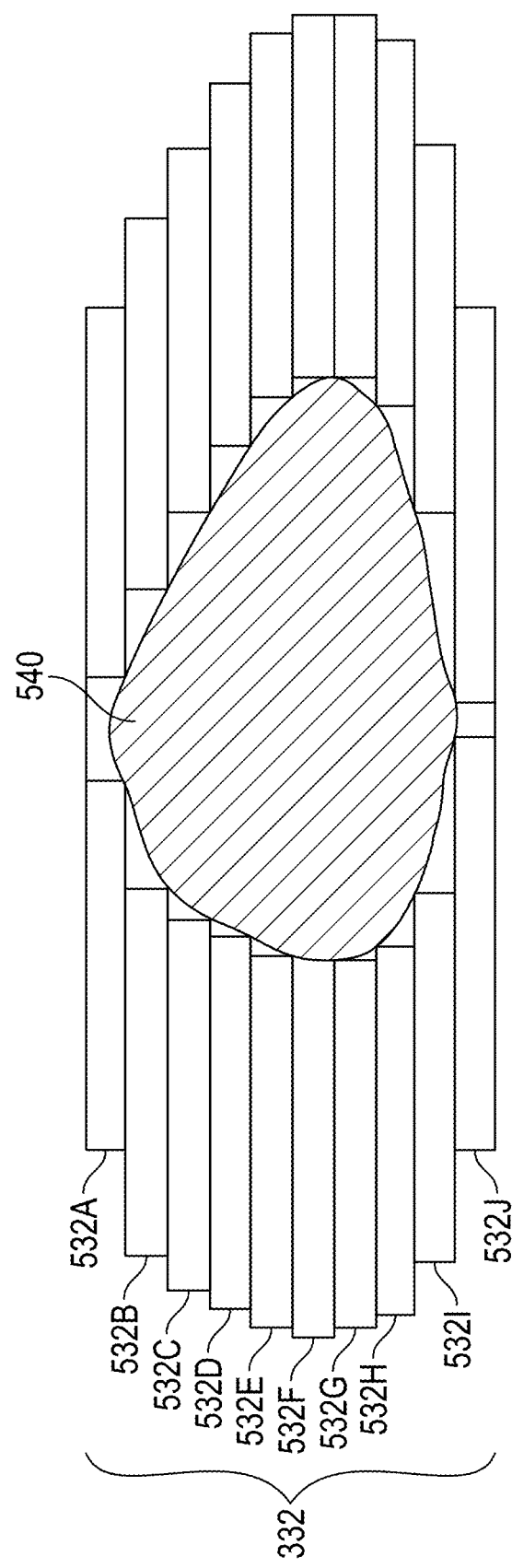

DOSE VOLUME HISTOGRAM OPTIMIZATION BASED ON QUANTILE REGRESSION

TECHNICAL FIELD

Embodiments of the present disclosure pertain generally to radiotherapy treatment sessions and specifically to imaging techniques.

BACKGROUND

Radiation therapy (or "radiotherapy") may be used to treat cancers or other ailments in mammalian (e.g., human and animal) tissue. One such radiotherapy technique involves irradiation with a Gamma Knife®, whereby a patient is irradiated by a large number of low-intensity gamma ray beams that converge with high intensity and high precision at a target (e.g., a tumor). In another embodiment, radiotherapy is provided using a linear accelerator, whereby a tumor is irradiated by high-energy particles (e.g., electrons, protons, ions, high-energy photons, and the like). The placement and dose of the radiation beam must be accurately controlled to ensure the tumor receives the prescribed radiation, and the placement of the beam should be such as to minimize damage to the surrounding healthy tissue, often called the organ(s) at risk (OARs). Radiation is termed "prescribed" because a physician orders a predefined amount of radiation to the tumor and surrounding organs similar to a prescription for medicine. Generally, ionizing radiation in the form of a collimated beam is directed from an external radiation source toward a patient but the radiation can also come from radioactive seeds located in the tumor.

A specified or selectable beam energy may be used, such as for delivering a diagnostic energy level range or a therapeutic energy level range. Modulation of a radiation beam may be provided by one or more attenuators or collimators (e.g., a multi-leaf collimator (MLC)). The intensity and shape of the radiation beam may be adjusted by collimation to avoid damaging healthy tissue (e.g., OARs) adjacent to the targeted tissue by conforming the projected beam to a profile of the targeted tissue.

The treatment planning procedure may include using a three-dimensional (3D) image of the patient to identify a target region (e.g., the tumor) and to identify critical organs near the tumor. Creation of a treatment plan may be a time-consuming process where a planner tries to comply with various treatment objectives or constraints (e.g., dose volume histogram (DVH), overlap volume histogram (OVH)), taking into account their individual importance (e.g., weighting) in order to produce a treatment plan that is clinically acceptable. This task may be a time-consuming trial-and-error process that is complicated by the various OARs because as the number of OARs increases (e.g., up to thirteen for a head-and-neck treatment), so does the complexity of the process. OARs distant from a tumor may be easily spared from radiation, while OARs close to or overlapping a target tumor may be difficult to spare.

Traditionally, for each patient, the initial treatment plan may be generated in an "offline" manner. The treatment plan may be developed well before radiation therapy is delivered, such as using one or more medical imaging techniques. Imaging information may include, for example, images from X-rays, computed tomography (CT), nuclear magnetic resonance (MR), positron emission tomography (PET), single-photon emission computed tomography (SPECT), or ultrasound. A health care provider, such as a physician, may use 3D imaging information indicative of the patient anatomy to identify one or more target tumors along with the OARs near the tumor(s). The health care provider may delineate the target tumor that is to receive a prescribed radiation dose using a manual technique, and the health care provider may similarly delineate nearby tissue, such as organs, at risk of damage from the radiation treatment. Alternatively, or additionally, an automated tool (e.g., ABAS provided by Elekta AB, Sweden) may be used to assist in identifying or delineating the target tumor and organs at risk. A radiation therapy treatment plan ("treatment plan") may then be created using an optimization technique based on clinical and dosimetric objectives and constraints (e.g., the maximum, minimum, and fraction of dose of radiation to a fraction of the tumor volume ("95% of target shall receive no less than 100% of prescribed dose"), and like measures for the critical organs). The optimized plan is comprised of numerical parameters that specify the direction, cross-sectional shape, and intensity of each radiation beam.

Later, the treatment plan may be executed by positioning the patient in the treatment machine and delivering the prescribed radiation therapy directed by the optimized plan parameters. The radiation therapy treatment plan may include dose "fractioning," whereby a sequence of radiation treatments is provided over a predetermined period of time (e.g., 30-45 daily fractions), with each treatment including a specified fraction of a total prescribed dose. However, during treatment, the position of the patient and the position of the target tumor in relation to the treatment machine (e.g., linear accelerator—"linac") is very important in order to ensure the target tumor and not healthy tissue is irradiated.

Since most patients receive more than one fraction of radiation as part of a course of therapy, and because the anatomy may change (deform) between these fractions, it is not straightforward to sum the doses delivered during the individual fractions so the physician may accurately gauge how the treatment is proceeding relative to the original intent as defined by the prescription.

OVERVIEW

Dose-volume criteria may be equivalently expressed in terms of quantiles. This re-formulation of a dose-volume criteria allows incorporation of dose-volume criteria into a full optimization problem. Radiotherapy treatment techniques are described that may apply optimization-based formulation of quantiles to express dose-volume criterion as an inequality involving an optimization problem, which may improve DVH modeling, improve computational speed and accuracy of radiation treatment planning, and improve the delivery accuracy and efficacy of radiation doses to a patient undergoing radiotherapy treatment.

In some aspects, this disclosure is directed to a computer-implemented method for generating a radiotherapy treatment plan for a patient, the method comprising: receiving, by processor circuitry, a plurality of treatment planning criteria including at least one dose-volume criterion that corresponds to a quantile of a dose-volume histogram; determining a first radiotherapy optimization problem based on the received plurality of treatment planning criteria; determining, for each quantile, a second radiotherapy optimization problem such that a solution to the second radiotherapy optimization problem estimates a radiotherapy dose that corresponds to a specified fractional portion of a volume of the patient, wherein the first radiotherapy optimization problem is based on solutions to at least one of the other second radiotherapy optimization problems; processing the first radiotherapy optimization problem and the second radiotherapy optimization problems corresponding to each quantile to determine mutually consistent solutions to both the first radiotherapy optimization problem and the second radiotherapy optimization problems corresponding to each quantile; and processing the determined solution to the first radiotherapy optimization problem to generate the radiotherapy treatment plan.

In some aspects, this disclosure is directed to a radiotherapy system for generating a radiotherapy treatment plan for a patient, the radiotherapy system comprising: a radiation therapy device configured to deliver a dose of radiation to an anatomical region of interest; and a processor configured to: receive a plurality of treatment planning criteria including at least one dose-volume criterion that corresponds to a quantile of a dose-volume histogram; determine a first radiotherapy optimization problem based on the received plurality of treatment planning criteria; determine, for each quantile, a second radiotherapy optimization problem such that a solution to the second radiotherapy optimization problem estimates a radiotherapy dose that corresponds to a specified fractional portion of a volume of the patient, wherein the first radiotherapy optimization problem is based on solutions to at least one of the other second radiotherapy optimization problems; process the first radiotherapy optimization problem and the second radiotherapy optimization problems corresponding to each quantile to determine mutually consistent solutions to both the first radiotherapy optimization problem and the second radiotherapy optimization problems corresponding to each quantile; and process the determined solution to the first radiotherapy optimization problem to generate the radiotherapy treatment plan.

In some aspects, this disclosure is directed to a computer-readable medium configured to include instructions that, when executed, cause one or more processors to: receive a plurality of treatment planning criteria including at least one dose-volume criterion that corresponds to a quantile of a dose-volume histogram; determine a first radiotherapy optimization problem based on the received plurality of treatment planning criteria; determine, for each quantile, a second radiotherapy optimization problem such that a solution to the second radiotherapy optimization problem estimates a radiotherapy dose that corresponds to a specified fractional portion of a volume of a patient, wherein the first radiotherapy optimization problem is based on solutions to at least one of the other second radiotherapy optimization problems; process the first radiotherapy optimization problem and the second radiotherapy optimization problems corresponding to each quantile to determine mutually consistent solutions to both the first radiotherapy optimization problem and the second radiotherapy optimization problems corresponding to each quantile; and process the determined solution to the first radiotherapy optimization problem to generate the radiotherapy treatment plan.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example but not by way of limitation, various embodiments discussed in the present document.

FIG. 5 illustrates an example of a collimator configuration for shaping, directing, or modulating an intensity of a radiation therapy beam, according to some embodiments of the present disclosure.

DETAILED DESCRIPTION

Figure 1:
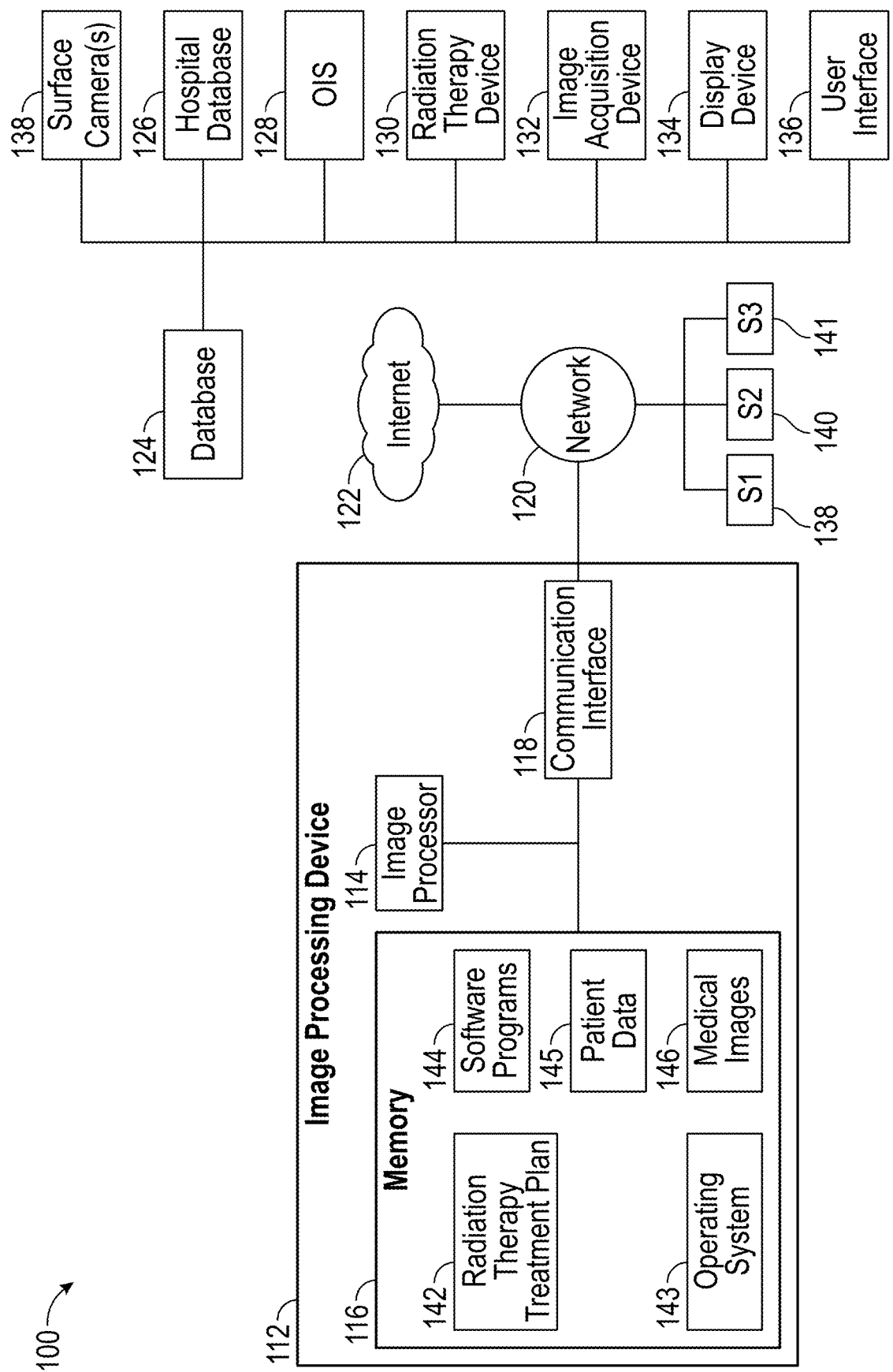
FIG. 1 illustrates an example of a radiotherapy system, according to some embodiments of the present disclosure.

In the following detailed description, reference is made to the accompanying drawings which form a part hereof, and which is shown by way of illustration-specific embodiments in which the present disclosure may be practiced. These embodiments, which are also referred to herein as "examples," are described in sufficient detail to enable those skilled in the art to practice the disclosure, and it is to be understood that the embodiments may be combined, or that other embodiments may be utilized, and that structural, logical, and electrical changes may be made without departing from the scope of the present disclosure. The following detailed description is, therefore, not be taken in a limiting sense, and the scope of the present disclosure is defined by the appended claims and their equivalents.

When optimizing plans in radiotherapy, clinicians often impose a set of dose-volume histograms (DVHs) on structures such as organs at risk (OAR) to assess the quality of a treatment plan. Each structure may have its own DVH, which is a curve ($\alpha$, y) where $\alpha$ is the fraction of the structure's volume that receives a dose of at least y Gray.

Common wisdom in radiotherapy treatment planning is that DVH-criteria require sorting, which makes them combinatorial in nature and therefore difficult to optimize. In particular, exact formulations of DVH-criteria have not been continuously differentiable.

In general, quite complicated convex re-formulations are used to approximate DVH-objectives, leading to an infinite expansion of convex functions. To make the optimization problem tractable, only a finite number of terms may be kept, which means the model is approximate. Also, the higher order terms are non-linear and non-quadratic leading to a complicated optimization problem with long solution times.

The present inventors have recognized that dose-volume criteria may be equivalently expressed in terms of quantiles. This re-formulation of a dose-volume criteria allows incorporation of dose-volume criteria into a full optimization problem. This disclosure describes a radiotherapy treatment system that may apply optimization-based formulation of quantiles to express dose-volume criterion as an inequality involving an optimization problem, which may improve DVH modeling, improve computational speed and accuracy of radiation treatment planning, and improve the delivery accuracy and efficacy of radiation doses to a patient undergoing radiotherapy treatment.

This disclosure describes, among other things, techniques (including systems and methods) for generating a radiotherapy treatment plan for a patient that may determine and solve a nested optimization problem, such as a bi-level optimization problem, which may include an outer optimization problem defined in terms of solutions to one or several inner optimization problems parameterized by optimization variables from the outer problem. For example, a method may include, among other things, determining a first radiotherapy optimization problem based on a received plurality of treatment planning criteria including at least one dose-volume criterion, such as corresponding to a target or an organ at risk, that corresponds to a quantile of a DVH. Then, the method may include determining, for each quantile, a second radiotherapy optimization problem such that a solution to the second radiotherapy optimization problem estimates a radiotherapy dose that corresponds to a specified fractional portion of a volume of the patient, where the first radiotherapy optimization problem is based on solutions to at least one of the other second radiotherapy optimization problems. The method may include processing the first radiotherapy optimization problem and the second radiotherapy optimization problems corresponding to each quantile to determine mutually consistent solutions to both the first radiotherapy optimization problem and the second radiotherapy optimization problems corresponding to each quantile. The method may then include processing the determined solution to the first radiotherapy optimization problem to generate a radiotherapy treatment plan.

A mathematical optimization problem, or just optimization problem, may comprise an objective function, a feasible set, optimization variables and problem parameters. To determine an optimization problem, one has to define the optimization variables, also called decision variables, and at least one of an objective function and a feasible set.

Optimization problems can equivalently be defined as minimization or maximization problems. The objective function is known under many names: in minimization problems it may be called, for example, cost function or loss function;

in maximization problems it may be called, for example, reward function or utility function. For clarity, the description will henceforth be limited to minimization problems.

The objective function assigns a score to every point which describes the "undesirability" of that point. Occasionally, it may be advantageous to assign an infinite score to points that are not in the feasible set.

The feasible set is the set of points that are allowed. The feasible set may be expressed as a collection of constraints which may, in turn, be described using a combination of constraint functions and mathematical relations (equals, less than or equal to, belongs to, is orthogonal to, etc.). An optimization problem for which a feasible set but no objective function has been determined is referred to as a feasibility problem.

To process an optimization problem, or simply optimize, means to search for values of the optimization variables that achieves a small value of the objective function while satisfying the constraints. In a feasibility problem, the aim is to find any feasible point, or to verify that none exists.

A point is called optimal, or a solution of the optimization problem, if it has the smallest objective value among all vectors in the feasible set. A point is called locally optimal, or a local solution, if it has the smallest objective value among all feasible vectors in its neighborhood.

Any component of an optimization problem, for instance an objective function, a constraint function or a feasible set, may be parameterized, which means that it is only specified up to the value of some parameter referred to as a problem parameter or problem data. Problem parameters are often held fixed when processing an optimization problem. But, to process difficult optimization problems effectively, it may be advantageous to, for example, modify, reduce or expand the set of problem parameters during the optimization process. For instance, block coordinate descent methods cyclically optimize one block of optimization variables while temporarily treating the others as parameters. Due to this flexibility, and lack of clear-cut separation, between optimization variables and problem parameters, this disclosure refers to them jointly as the problem scope.

FIG. 1 illustrates an example of a radiotherapy system 100 for providing radiation therapy to a patient. The radiotherapy system 100 includes an image processing device 112. The image processing device 112 may be connected to a network 120. The network 120 may be connected to the Internet 122. The network 120 may connect the image processing device 112 with one or more of a database 124, a hospital database 126, an oncology information system (OIS) 128, a radiation therapy device 130, an image acquisition device 132, a display device 134, a user interface 136, and one or more surface cameras 138, such as surface cameras 138A-138C in FIG. 2A and/or surface camera 138D in FIG. 2B. Examples of surface cameras 138 may include those manufactured by C-Rad, VisionRT, and Varian HumediQ. The surface camera (s) 138 (e.g., one or more 2D or 3D cameras) may be used to acquire real-time images of the surface of a patient's body (e.g., the patient's skin) while medical images are being acquired. For Gamma Knife® mask treatments, an IR camera registers movements of markers fixed on the nose of the patient. Because the surface imaging is taken at the same time as the medical imaging, the surface imaging may provide a more accurate definition of the location of the boundaries of the patient's body while the medical imaging was taken. The image processing device 112 may be configured to generate radiation therapy treatment plans 142 to be used by the radiation therapy device 130.

The image processing device 112 may include a memory device 116, an image processor 114, and a communication interface 118. The memory device 116 may store computer-executable instructions, such as an operating system 143, radiation therapy treatment plans 142 (e.g., original treatment plans, adapted treatment plans and the like), software programs 144 (e.g., artificial intelligence, deep learning, neural networks, radiotherapy treatment plan software), and any other computer-executable instructions to be executed by the image processor 114.

In one embodiment, the software programs 144 may convert medical images of one format (e.g., MRI) to another format (e.g., CT) by producing synthetic images, such as pseudo-CT images. For instance, the software programs 144 may include image processing programs to train a predictive model for converting a medical image 146 in one modality (e.g., an MRI image) into a synthetic image of a different modality (e.g., a pseudo-CT image); alternatively, the trained predictive model may convert a CT image into an MM image.

In another embodiment, the software programs 144 may register the patient image (e.g., a CT image or an MR image) with that patient's dose distribution (also represented as an image) so that corresponding image voxels and dose voxels are associated appropriately by the network.

In yet another embodiment, the software programs 144 may substitute functions of the patient images or processed versions of the images that emphasize some aspect of the image information. Such functions might emphasize edges or differences in voxel textures, or any other structural aspect useful to neural network learning.

In another embodiment, the software programs 144 may substitute functions of the dose distribution that emphasize some aspect of the dose information. Such functions might emphasize steep gradients around the target or any other structural aspect useful to neural network learning. The memory device 116 may store data, including medical images 146, patient data 145, and other data required to create and implement a radiation therapy treatment plan 142.

In yet another embodiment, the software programs 144 may generate a structural estimate (e.g., a 3D model of the region of interest) using an iterative image reconstruction process. The structural estimate may be or include an X-ray attenuation map that represents a 3D model of a region of interest. The structural estimate may be used to estimate or simulate X-ray measurements to be compared with real X-ray measurements for updating the structural estimate. Specifically, the software programs 144 may access a current structural estimate of the region of interest and generate a first simulated X-ray measurement based on the current structural estimate of the region of interest.

A simulated X-ray measurement, as referred to herein, represents the expected output of an X-ray detector element when an X-ray source projects one or more X-ray beams through the region of interest towards the X-ray detector element. The simulated X-ray measurement may provide an expected image output that is to be received from the X-ray detector element.

The software programs 144 may receive a first real X-ray measurement from a CBCT system (or other CT imaging system, such as an enclosed gantry helical multi-slice CT with a curved detector or tomotherapy system) and generate an update to the current structural estimate of the region of interest as a function of the first simulated X-ray measurement and the first real X-ray measurement. A real X-ray measurement, as referred to herein, is an actual output that is received from a CBCT system (or other CT imaging system, such as an enclosed gantry helical multi-slice CT with a curved detector or tomotherapy system) that represents the amount of signal generated by X-rays in the detector along different directions, such as in an image form.

The update may be generated invariant on (independent of) the current structural estimate. The structural estimate may be used to control one or more radiotherapy treatment parameters by recalculating dose, adjusting one or more radiotherapy treatment machine parameters, or generating a display of the structural estimate on a graphical user interface.

In addition to the memory device 116 storing the software programs 144, it is contemplated that software programs 144 may be stored on a removable computer medium, such as a hard drive, a computer disk, a CD-ROM, a DVD, a HD, a Blu-Ray DVD, USB flash drive, a SD card, a memory stick, or any other suitable medium; and the software programs 144 when downloaded to image processing device 112 may be executed by image processor 114.

The processor 114 may be communicatively coupled to the memory device 116, and the processor 114 may be configured to execute computer-executable instructions stored thereon. The processor 114 may send or receive medical images 146 to memory device 116. For example, the processor 114 may receive medical images 146 from the image acquisition device 132 via the communication interface 118 and network 120 to be stored in memory device 116. The processor 114 may also send medical images 146 stored in memory device 116 via the communication interface 118 to the network 120 be either stored in database 124 or the hospital database 126.

Further, the processor 114 may utilize software programs 144 (e.g., a treatment planning software) along with the medical images 146 and patient data 145 to create the radiation therapy treatment plan 142. Medical images 146 may include information such as imaging data associated with a patient anatomical region, organ, or volume of interest segmentation data. Patient data 145 may include information such as (1) functional organ modeling data (e.g., serial versus parallel organs, appropriate dose response models, etc.); (2) radiation dosage data (e.g., DVH information); or (3) other clinical information about the patient and course of treatment (e.g., other surgeries, chemotherapy, previous radiotherapy, etc.).

In addition, the processor 114 may utilize software programs to generate intermediate data such as updated parameters to be used, for example, by a machine learning model, such as a neural network model; or generate intermediate 2D or 3D images, which may then subsequently be stored in memory device 116. The processor 114 may subsequently transmit the executable radiation therapy treatment plan 142 via the communication interface 118 to the network 120 to the radiation therapy device 130, where the radiation therapy plan will be used to treat a patient with radiation. In addition, the processor 114 may execute software programs 144 to implement functions such as image conversion, image segmentation, deep learning, neural networks, and artificial intelligence. For instance, the processor 114 may execute software programs 144 that train or contour a medical image; such software programs 144 when executed may train a boundary detector or utilize a shape dictionary.

The processor 114 may be a processing device, including one or more general-purpose processing devices such as a microprocessor, a central processing unit (CPU), a graphics processing unit (GPU), an accelerated processing unit (APU), or the like. More particularly, the processor 114 may be a complex instruction set computing (CISC) microprocessor, a reduced instruction set computing (RISC) microprocessor, a very long instruction Word (VLIW) microprocessor, a processor implementing other instruction sets, or processors implementing a combination of instruction sets. The processor 114 may also be implemented by one or more special-purpose processing devices such as an application-specific integrated circuit (ASIC), a field programmable gate array (FPGA), a digital signal processor (DSP), a System on a Chip (SoC), or the like. As would be appreciated by those skilled in the art, in some embodiments, the processor 114 may be a special-purpose processor rather than a general-purpose processor. The processor 114 may include one or more known processing devices, such as a microprocessor from the Pentium™, Core™, Xeon™, or Itanium® family manufactured by Intel™, the Turion™, Athlon™, Sempron™, Opteron™, FX™, Phenom™ family manufactured by AMD™, or any of various processors manufactured by Sun Microsystems. The processor 114 may also include graphical processing units such as a GPU from the GeForce®, Quadro®, Tesla® family manufactured by Nvidia™, GMA, Iris™ family manufactured by Intel™, or the Radeon™ family manufactured by AMD™. The processor 114 may also include accelerated processing units such as the Xeon Phi™ family manufactured by Intel™. The disclosed embodiments are not limited to any type of processor(s) otherwise configured to meet the computing demands of identifying, analyzing, maintaining, generating, and/or providing large amounts of data or manipulating such data to perform the methods disclosed herein. In addition, the term "processor" may include more than one processor (for example, a multi-core design or a plurality of processors each having a multi-core design). The processor 114 may execute sequences of computer program instructions, stored in memory device 116, to perform various operations, processes, methods that will be explained in greater detail below.

The memory device 116 may store medical images 146. In some embodiments, the medical images 146 may include one or more MRI images (e.g., 2D MM, 3D MRI, 2D streaming MM, four-dimensional (4D) MRI, 4D volumetric MRI, 4D cine MRI, etc.), functional MM images (e.g., fMRI, DCE-MRI, diffusion MRI), CT images (e.g., 2D CT, cone beam CT, 3D CT, 4D CT), ultrasound images (e.g., 2D ultrasound, 3D ultrasound, 4D ultrasound), one or more projection images representing views of an anatomy depicted in the MM, synthetic CT (pseudo-CT), and/or CT images at different angles of a gantry relative to a patient axis, PET images, X-ray images, fluoroscopic images, radiotherapy portal images, SPECT images, computer generated synthetic images (e.g., pseudo-CT images), aperture images, graphical aperture image representations of MLC leaf positions at different gantry angles, and the like. Further, the medical images 146 may also include medical image data, for instance, training images, ground truth images, contoured images, and dose images. In an embodiment, the medical images 146 may be received from the image acquisition device 132. Accordingly, image acquisition device 132 may include an MRI imaging device, a Megavolt (MV) imaging device, a CT imaging device, a CBCT imaging device, a PET imaging device, an ultrasound imaging device, a fluoroscopic device, a SPECT imaging device, an integrated linac and MRI imaging device, an integrated linac and CT imaging device, an integrated linac and CBCT imaging device, or other medical imaging devices for obtaining the medical images of the patient. The medical images 146 may be received and stored in any type of data or any type of format that the image processing device 112 may use to perform operations consistent with the disclosed embodiments.

The memory device 116 may be a non-transitory computer-readable medium, such as a read-only memory (ROM), a phase-change random access memory (PRAM), a static random access memory (SRAM), a flash memory, a random access memory (RAM), a dynamic random access memory (DRAM) such as synchronous DRAM (SDRAM), an electrically erasable programmable read-only memory (EEPROM), a static memory (e.g., flash memory, flash disk, static random access memory) as well as other types of random access memories, a cache, a register, a CD-ROM, a DVD or other optical storage, a cassette tape, other magnetic storage device, or any other non-transitory medium that may be used to store information including image, data, or computer-executable instructions (e.g., stored in any format) capable of being accessed by the processor 114, or any other type of computer device. The computer program instructions may be accessed by the processor 114, read from the ROM, or any other suitable memory location, and loaded into the RAM for execution by the processor 114. For example, the memory device 116 may store one or more software applications. Software applications stored in the memory device 116 may include, for example, an operating system 143 for common computer systems as well as for software-controlled devices. Further, the memory device 116 may store an entire software application, or only a part of a software application, that is executable by the processor 114. For example, the memory device 116 may store one or more radiation therapy treatment plans 142.

The image processing device 112 may communicate with the network 120 via the communication interface 118, which may be communicatively coupled to the processor 114 and the memory device 116. The communication interface 118 may provide communication connections between the image processing device 112 and radiotherapy system 100 components (e.g., permitting the exchange of data with external devices). For instance, the communication interface 118 may, in some embodiments, have appropriate interfacing circuitry to connect to the user interface 136, which may be a hardware keyboard, a keypad, or a touch screen through which a user may input information into radiotherapy system 100.

Communication interface 118 may include, for example, a network adaptor, a cable connector, a serial connector, a USB connector, a parallel connector, a high-speed data transmission adaptor (e.g., such as fiber, USB 3.0, thunderbolt, and the like), a wireless network adaptor (e.g., such as a WiFi adaptor), a telecommunication adaptor (e.g., 3G, 4G/LTE and the like), and the like. Communication interface 118 may include one or more digital and/or analog communication devices that permit image processing device 112 to communicate with other machines and devices, such as remotely located components, via the network 120.

The network 120 may provide the functionality of a local area network (LAN), a wireless network, a cloud computing environment (e.g., software as a service, platform as a service, infrastructure as a service, etc.), a client-server, a wide area network (WAN), and the like. For example, network 120 may be a LAN or a WAN that may include other systems S1 (138), S2 (140), and S3 (141). Systems S1, S2, and S3 may be identical to image processing device 112 or may be different systems. In some embodiments, one or more systems in network 120 may form a distributed computing/simulation environment that collaboratively performs the embodiments described herein. In some embodiments, one or more systems S1, S2, and S3 may include a CT scanner that obtains CT images (e.g., medical images 146). In addition, network 120 may be connected to Internet 122 to communicate with servers and clients that reside remotely on the internet.

Therefore, network 120 may allow data transmission between the image processing device 112 and a number of various other systems and devices, such as the OIS 128, the radiation therapy device 130, and the image acquisition device 132. Further, data generated by the OIS 128 and/or the image acquisition device 132 may be stored in the memory device 116, the database 124, and/or the hospital database 126. The data may be transmitted/received via network 120, through communication interface 118 in order to be accessed by the processor 114, as required.

The image processing device 112 may communicate with database 124 through network 120 to send/receive a plurality of various types of data stored on database 124. For example, database 124 may include machine data (control points) that includes information associated with a radiation therapy device 130, image acquisition device 132, or other machines relevant to radiotherapy. Machine data information may include control points, such as radiation beam size, arc placement, beam on and off time duration, machine parameters, segments, MLC configuration, gantry speed, MRI pulse sequence, and the like. Database 124 may be a storage device and may be equipped with appropriate database administration software programs. One skilled in the art would appreciate that database 124 may include a plurality of devices located either in a central or a distributed manner.

In some embodiments, database 124 may include a processor-readable storage medium. While the processor-readable storage medium in an embodiment may be a single medium, the term "processor-readable storage medium" should be taken to include a single medium or multiple media (e.g., a centralized or distributed database, and/or associated caches and servers) that store the one or more sets of computer-executable instructions or data. The term "processor-readable storage medium" shall also be taken to include any medium that is capable of storing or encoding a set of instructions for execution by a processor and that cause the processor to perform any one or more of the methodologies of the present disclosure. The term "processor-readable storage medium" shall accordingly be taken to include, but not be limited to, solid-state memories and optical and magnetic media. For example, the processor-readable storage medium may be one or more volatile, non-transitory, or non-volatile tangible computer-readable media.

Image processor 114 may communicate with database 124 to read images into memory device 116 or store images from memory device 116 to database 124. For example, the database 124 may be configured to store a plurality of images (e.g., 3D MRI, 4D MRI, 2D MRI slice images, CT images, 2D Fluoroscopy images, X-ray images, raw data from MR scans or CT scans, Digital Imaging and Communications in Medicine (DIMCOM) data, projection images, graphical aperture images, etc.) that the database 124 received from image acquisition device 132. Database 124 may store data to be used by the image processor 114 when executing software program 144 or when creating radiation therapy treatment plans 142. Database 124 may store the data produced by the trained machine learning mode, such as a neural network including the network parameters constituting the model learned by the network and the resulting estimated data. As referred to herein, "estimate" or "estimated" may be used interchangeably with "predict" or "predicted" and should be understood to have the same meaning. The image processing device 112 may receive the imaging data, such as a medical image 146 (e.g., 2D MRI slice images, CT images, 2D Fluoroscopy images, X-ray images, 3DMRI images, 4D MRI images, projection images, graphical aperture images, image contours, etc.) from the database 124, the radiation therapy device 130 (e.g., a linac or an MR-linac), and/or the image acquisition device 132 to generate a treatment plan 142. The radiation therapy device 130 can provide linac based treatments such as volumetric-modulated arc therapy (VMAT) or intensity modulated radiation therapy (IMRT), for example.

In an embodiment, the radiotherapy system 100 may include an image acquisition device 132 that may acquire medical images (e.g., MRI images, 3D MRI, 2D streaming MRI, 4D volumetric MRI, CT images, cone-Beam CT, PET images, functional MRI images (e.g., fMRI, DCE-MRI, and diffusion MRI), X-ray images, fluoroscopic image, ultrasound images, radiotherapy portal images, SPECT images, and the like) of the patient. Image acquisition device 132 may, for example, be an MRI imaging device, a CT imaging device, a PET imaging device, an ultrasound device, a fluoroscopic device, a SPECT imaging device, or any other suitable medical imaging device for obtaining one or more medical images of the patient. Images acquired by the image acquisition device 132 may be stored within database 124 as either imaging data and/or test data. By way of example, the images acquired by the image acquisition device 132 may be also stored by the image processing device 112 as medical images 146 in memory device 116.

In an embodiment, for example, the image acquisition device 132 may be integrated with the radiation therapy device 130 as a single apparatus (e.g., an MR-linac). Such an MR-linac may be used, for example, to determine a location of a target organ or a target tumor in the patient, so as to direct radiation therapy accurately according to the radiation therapy treatment plan 142 to a predetermined target.

The image acquisition device 132 may be configured to acquire one or more images of the patient's anatomy for a region of interest (e.g., a target organ, a target tumor, or both). Each image, typically a 2D image or slice, may include one or more parameters (e.g., a 2D slice thickness, an orientation, and a location, etc.). In an embodiment, the image acquisition device 132 may acquire a 2D slice in any orientation. For example, an orientation of the 2D slice may include a sagittal orientation, a coronal orientation, or an axial orientation. The processor 114 may adjust one or more parameters, such as the thickness and/or orientation of the 2D slice, to include the target organ and/or target tumor. In an embodiment, 2D slices may be determined from information such as a 3D MRI volume. Such 2D slices may be acquired by the image acquisition device 132 in "real-time" while a patient is undergoing radiation therapy treatment, for example, when using the radiation therapy device 130, with "real-time" meaning acquiring the data in at least milliseconds or less.

The image processing device 112 may generate and store radiation therapy treatment plans 142 for one or more patients. The radiation therapy treatment plans 142 may provide information about a particular radiation dose to be applied to each patient. The radiation therapy treatment plans 142 may also include other radiotherapy information, such as control points including beam angles, gantry angles, beam intensity, dose-histogram-volume information, the number of radiation beams to be used during therapy, the dose per beam, and the like.

The image processor 114 may generate the radiation therapy treatment plan 142 by using software programs 144 such as treatment planning software (such as Leksell Gamma Plan® Monaco®, manufactured by Elekta, Sweden). In order to generate the radiation therapy treatment plans 142, the image processor 114 may communicate with the image acquisition device 132 (e.g., a CT device, an MRI device, a PET device, an X-ray device, an ultrasound device, etc.) to access images of the patient and to delineate a target, such as a tumor, to generate contours of the images. In some embodiments, the delineation of one or more OARs, such as healthy tissue surrounding the tumor or in close proximity to the tumor, may be required. Therefore, segmentation of the OAR may be performed when the OAR is close to the target tumor. In addition, if the target tumor is close to the OAR (e.g., prostate in near proximity to the bladder and rectum), then by segmenting the OAR from the tumor, the radiotherapy system 100 may study the dose distribution not only in the target but also in the OAR.

In order to delineate a target organ or a target tumor from the OAR, medical images, such as MRI images, CT images, PET images, fMRI images, X-ray images, ultrasound images, radiotherapy portal images, SPECT images, and the like, of the patient undergoing radiotherapy may be obtained non-invasively by the image acquisition device 132 to reveal the internal structure of a body part. Based on the information from the medical images, a 3D structure of the relevant anatomical portion may be obtained and used to generate a contour of the image. Contours of the image may include data overlaid on top of the image that delineates one or more structures of the anatomy. In some cases, the contours may be files associated with respective images that specify the coordinates or 2D or 3D locations of various structures of the anatomy depicted in the images.

In addition, during a treatment planning process, many parameters may be taken into consideration to achieve a balance between efficient treatment of the target tumor (e.g., such that the target tumor receives enough radiation dose for an effective therapy) and low irradiation of the OAR(s) (e.g., the OAR(s) receives as low a radiation dose as possible). Other parameters that may be considered include the location of the target organ and the target tumor, the location of the OAR, and the movement of the target in relation to the OAR. For example, the 3D structure may be obtained by contouring the target or contouring the OAR within each 2D layer or slice of an MRI or CT image and combining the contour of each 2D layer or slice. The contour may be generated manually (e.g., by a physician, dosimetrist, or health care worker using a program such as Leksell Gamma Plan® manufactured by Elekta) or automatically (e.g., using a program such as the Atlas-based auto-segmentation software, ABAS™, manufactured by Elekta). In certain embodiments, the 3D structure of a target tumor or an OAR may be generated automatically by the treatment planning software.

After the target tumor and the OAR(s) have been located and delineated, a dosimetrist, physician, or healthcare worker may determine a dose of radiation to be applied to the target tumor, as well as any maximum amounts of dose that may be received by the OAR proximate to the tumor (e.g., left and right parotid, optic nerves, eyes, lens, inner ears, spinal cord, brain stem, and the like). After the radiation dose is determined for each anatomical structure (e.g., target tumor, OAR), a process known as inverse planning may be performed to determine one or more treatment plan parameters that would achieve the desired radiation dose distribution. Examples of treatment plan parameters include volume delineation parameters (e.g., which define target volumes, contour sensitive structures, etc.), margins around the target tumor and OARs, beam angle selection, collimator settings, and beam-on times.

During the inverse-planning process, the physician may define dose constraint parameters that set bounds on how much radiation an OAR may receive (e.g., defining full dose to the tumor target and zero dose to any OAR; defining 95% of dose to the target tumor; defining that the spinal cord, brain stem, and optic structures receive ≤45 Gy, ≤55 Gy and ≤54 Gy, respectively). The result of inverse planning may constitute a radiation therapy treatment plan 142 that may be stored in memory device 116 or database 124. Some of these treatment parameters may be correlated. For example, tuning one parameter (e.g., weights for different objectives, such as increasing the dose to the target tumor) in an attempt to change the treatment plan may affect at least one other parameter, which in turn may result in the development of a different treatment plan. Thus, the image processing device 112 may generate a tailored radiation therapy treatment plan 142 having these parameters in order for the radiation therapy device 130 to provide radiotherapy treatment to the patient.

In addition, the radiotherapy system 100 may include a display device 134 and a user interface 136. The display device 134 may include one or more display screens that display medical images, interface information, treatment planning parameters (e.g., projection images, graphical aperture images, contours, dosages, beam angles, etc.) treatment plans, a target, localizing a target and/or tracking a target, or any related information to the user. The user interface 136 may be a keyboard, a keypad, a touch screen, or any type of device that a user may use to input information to radiotherapy system 100. Alternatively, the display device 134 and the user interface 136 may be integrated into a device such as a tablet computer (e.g., Apple iPad®, Lenovo Thinkpad®, Samsung Galaxy®, etc.).

Furthermore, any and all components of the radiotherapy system 100 may be implemented as a virtual machine (e.g., VMWare, Hyper-V, and the like). For instance, a virtual machine may be software that functions as hardware. Therefore, a virtual machine may include at least one or more virtual processors, one or more virtual memories, and one or more virtual communication interfaces that together function as hardware. For example, the image processing device 112, the OIS 128, and the image acquisition device 132 could be implemented as a virtual machine. Given the processing power, memory, and computational capability available, the entire radiotherapy system 100 could be implemented as a virtual machine.

Using various techniques of this disclosure described in detail below, a system, such as the radiotherapy system 100, may generate a radiotherapy treatment plan for a patient by determining and solving a nested optimization problem, such as a bi-level optimization problem, which may include an outer optimization problem defined in terms of solutions to one or several inner optimization problems parameterized by optimization variables from the outer problem. For example, the method may include, among other things, determining a first radiotherapy optimization problem based on a received plurality of treatment planning criteria including at least one dose-volume criterion that corresponds to a quantile of a DVH. Then, the method may include determining, for each quantile, a second radiotherapy optimization problem such that a solution to the second radiotherapy optimization problem estimates a radiotherapy dose that corresponds to a specified fractional portion of a volume of the patient, where the first radiotherapy optimization problem is based on solutions to at least one of the other second radiotherapy optimization problems. The method may process the first radiotherapy optimization problem and the second radiotherapy optimization problems corresponding to each quantile to determine mutually consistent solutions to both the first radiotherapy optimization problem and the second radiotherapy optimization problems corresponding to each quantile. The method may then process the determined solution to the first radiotherapy optimization problem to generate a radiotherapy treatment plan.

Figure 2A:
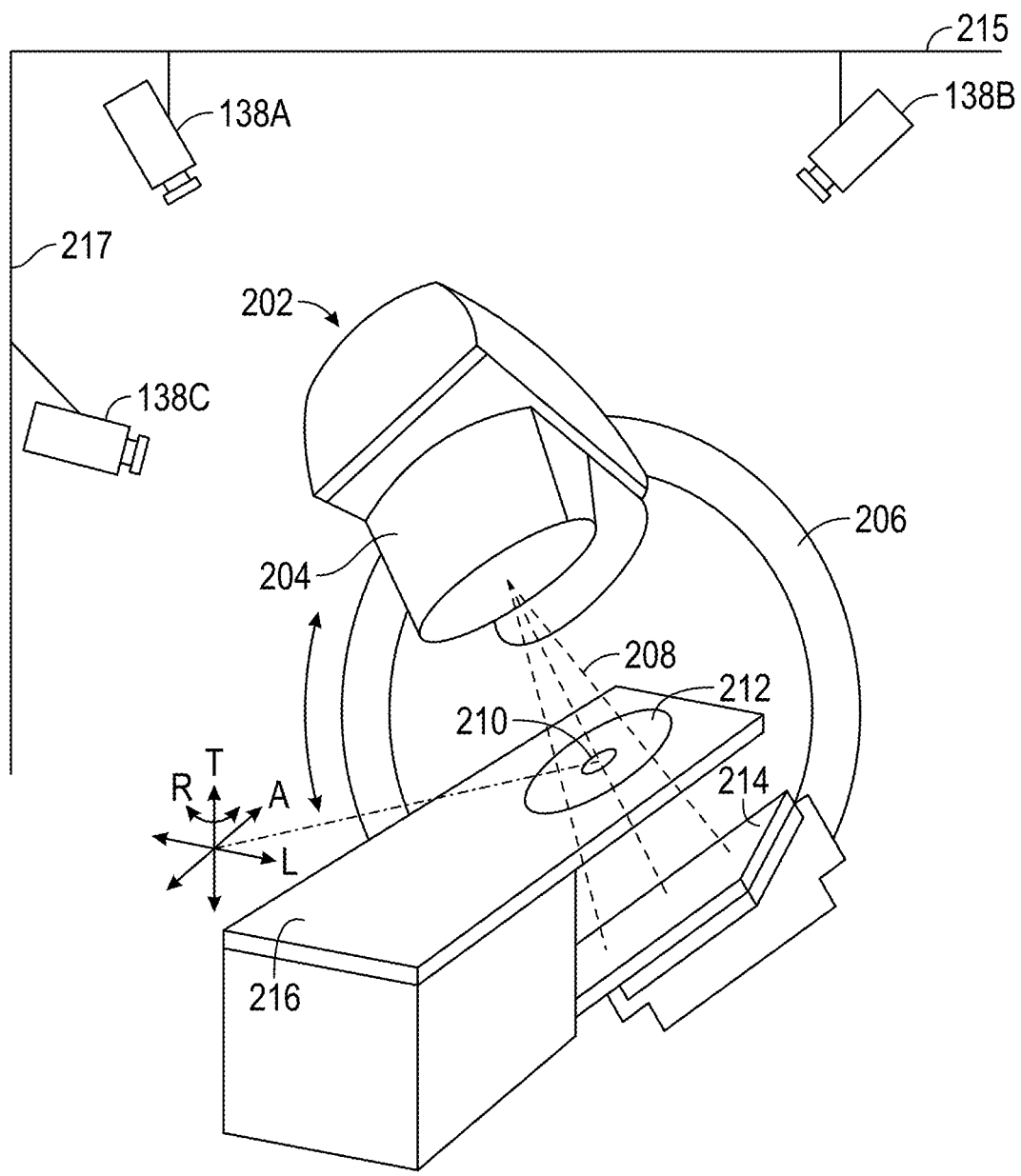
FIG. 2A illustrates an example a radiation therapy system that may include radiation therapy output configured to provide a therapy beam, according to some embodiments of the present disclosure.

FIG. 2A illustrates an example of a radiation therapy device 202 that may include a radiation source, such as an X-ray source or a linear accelerator, a couch 216, an imaging detector 214, and a radiation therapy output 204. The radiation therapy device 202 may be configured to emit a radiation beam 208 to provide therapy to a patient. The radiation therapy output 204 may include one or more attenuators or collimators, such as an MLC as described in the illustrative embodiment of FIG. 5, below.

Referring back to FIG. 2A, a patient may be positioned in a region 212 and supported by the treatment couch 216 to receive a radiation therapy dose, according to a radiation therapy treatment plan. The radiation therapy output 204 may be mounted or attached to a gantry 206 or other mechanical support. One or more chassis motors (not shown) may rotate the gantry 206 and the radiation therapy output 204 around couch 216 when the couch 216 is inserted into the treatment area. In an embodiment, gantry 206 may be continuously rotatable around couch 216 when the couch 216 is inserted into the treatment area. In another embodiment, gantry 206 may rotate to a predetermined position when the couch 216 is inserted into the treatment area. For example, the gantry 206 may be configured to rotate the therapy output 204 around an axis ("A"). Both the couch 216 and the radiation therapy output 204 may be independently moveable to other positions around the patient, such as moveable in transverse direction ("T"), moveable in a lateral direction ("L"), or as rotation about one or more other axes, such as rotation about a transverse axis (indicated as "R"). A controller communicatively connected to one or more actuators (not shown) may control the couch's 216 movements or rotations in order to properly position the patient in or out of the radiation beam 208 according to a radiation therapy treatment plan. Both the couch 216 and the gantry 206 are independently moveable from one another in multiple degrees of freedom, which allows the patient to be positioned such that the radiation beam 208 may precisely target the tumor. The MLC may be integrated and included within gantry 206 to deliver the radiation beam 208 of a certain shape.

The coordinate system (including axes A, T, and L) shown in FIG. 2A may have an origin located at an isocenter 210. The isocenter 210 may be defined as a location where the central axis of the radiation beam 208 intersects the origin of a coordinate axis, such as to deliver a prescribed radiation dose to a location on or within a patient. Alternatively, the isocenter 210 may be defined as a location where the central axis of the radiation beam 208 intersects the patient for various rotational positions of the radiation therapy output 204 as positioned by the gantry 206 around the axis A. As discussed herein, the gantry angle corresponds to the position of gantry 206 relative to axis A, although any other axis or combination of axes may be referenced and used to determine the gantry angle.

Gantry 206 may also have an attached imaging detector 214. The imaging detector 214 is preferably located opposite to the radiation source, and in an embodiment, the imaging detector 214 may be located within a field of the therapy beam 208.

The imaging detector 214 may be mounted on the gantry 206 (preferably opposite the radiation therapy output 204), such as to maintain alignment with the therapy beam 208. The imaging detector 214 rotates about the rotational axis as the gantry 206 rotates. In an embodiment, the imaging detector 214 may be a flat panel detector (e.g., a direct detector or a scintillator detector). In this manner, the imaging detector 214 may be used to monitor the therapy beam 208 or the imaging detector 214 may be used for imaging the patient's anatomy, such as portal imaging (e.g., to provide real X-ray measurements). The control circuitry of radiation therapy device 202 may be integrated within system 100 or remote from it.

In an illustrative embodiment, one or more of the couch 216, the therapy output 204, or the gantry 206 may be automatically positioned, and the therapy output 204 may establish the therapy beam 208 according to a specified dose for a particular therapy delivery instance. A sequence of therapy deliveries may be specified according to a radiation therapy treatment plan, such as using one or more different orientations or locations of the gantry 206, couch 216, or therapy output 204. The therapy deliveries may occur sequentially, but may intersect in a desired therapy locus on or within the patient, such as at the isocenter 210. A prescribed cumulative dose of radiation therapy may thereby be delivered to the therapy locus while damage to tissue near the therapy locus may be reduced or avoided.

In some examples, surface camera imaging data may be acquired using one or more surface cameras 138A-138C. FIG. 2A depicts one non-limiting example in which one or more surface cameras 138A, 138B may be affixed to a ceiling 215 in the therapy treatment room and/or one or more surface cameras 138C may be affixed to a wall 217 in the therapy treatment room. One or more of the surface cameras 138A-138C may acquire surface camera imaging data in real time. The surface camera imaging data from one or more of the surface cameras 138A-138C may then be transmitted to an image processing device, such as to the image processing device 112 of FIG. 1, to generate a model.

Figure 2B:
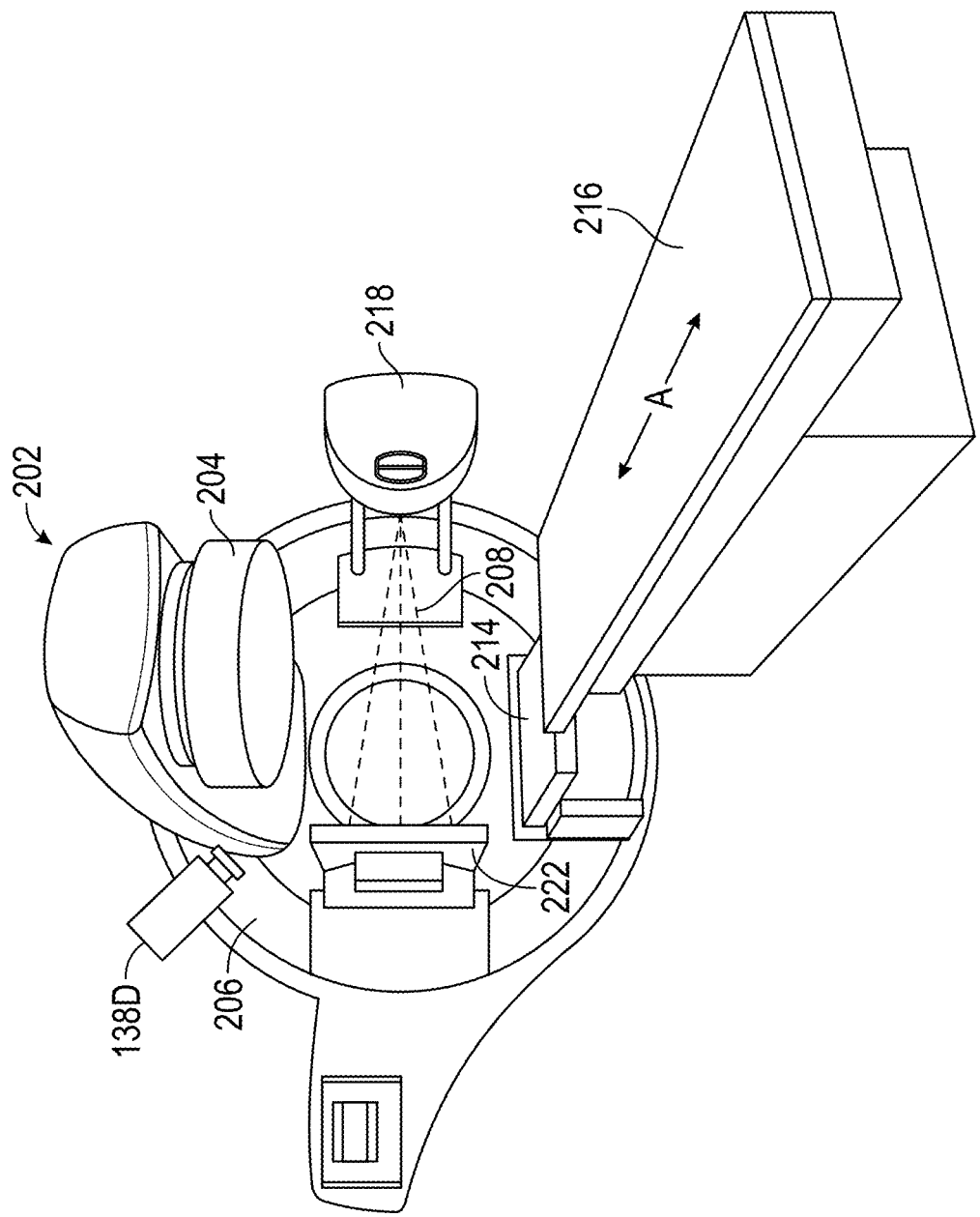
FIG. 2B illustrates an example of a system including a combined radiation therapy system and an imaging system, such as a cone beam computed tomography (CBCT) imaging system, according to some embodiments of the present disclosure.

FIG. 2B illustrates an example of a radiation therapy device 202 that may include a combined linac and an imaging system, such as may include a CT imaging system. The radiation therapy device 202 may include an MLC (not shown). The CT imaging system may include an imaging X-ray source 218, such as providing X-ray energy in a kiloelectron-Volt (keV) energy range which may be used for imaging the patient's anatomy, such as portal imaging (e.g., to provide real X-ray measurements). The imaging X-ray source 218 (also referred to as a "kV source" for kV imaging) may provide a fan-shaped and/or a conical beam 208 directed to an imaging detector 222, such as a flat panel detector. The radiation therapy device 202 may be similar to the system described in relation to FIG. 2A, such as including a radiation therapy output 204, a gantry 206, a couch 216, and another imaging detector 214 (such as a flat panel detector). The X-ray source 218 may provide a comparatively-lower-energy X-ray diagnostic beam, for imaging.

In the illustrative embodiment of FIG. 2B, the radiation therapy output 204, e.g., MV source, and the X-ray source 218, e.g., kV source, may be mounted on the same rotating gantry 206, rotationally-separated from each other by 90 degrees. This arrangement may enable imaging perpendicular to the beam of radiation output by radiation therapy output 204, which, in some embodiments, may be a Megavolt (MV) treatment beam. The kV source 218 may be used to acquire 2D X-ray projections for kV imaging as the kV source 218 moves around the patient along gantry 206.

In another embodiment, two or more X-ray sources may be mounted along the circumference of the gantry 206, such as each having its own detector arrangement to provide multiple angles of diagnostic imaging concurrently. Similarly, multiple radiation therapy outputs 204 may be provided.

FIG. 2B depicts another non-limiting example in which one or more surface cameras 138D may acquire surface camera imaging data. In the example shown in FIG. 2B, a surface camera 138D may be affixed to a frontside of a radiation therapy device 202, such as to a frontside of a CT bore and another surface camera may be affixed to a backside of the radiation therapy device 202, such as to a backside of a CT bore. In this manner, the surface cameras may provide a continuous view of the patient. The surface camera imaging data from the surface cameras, such as the surface camera 138D and a backside surface camera may then be transmitted to an image processing device, such as to the image processing device 112 of FIG. 1, to generate a model.

Figure 3:
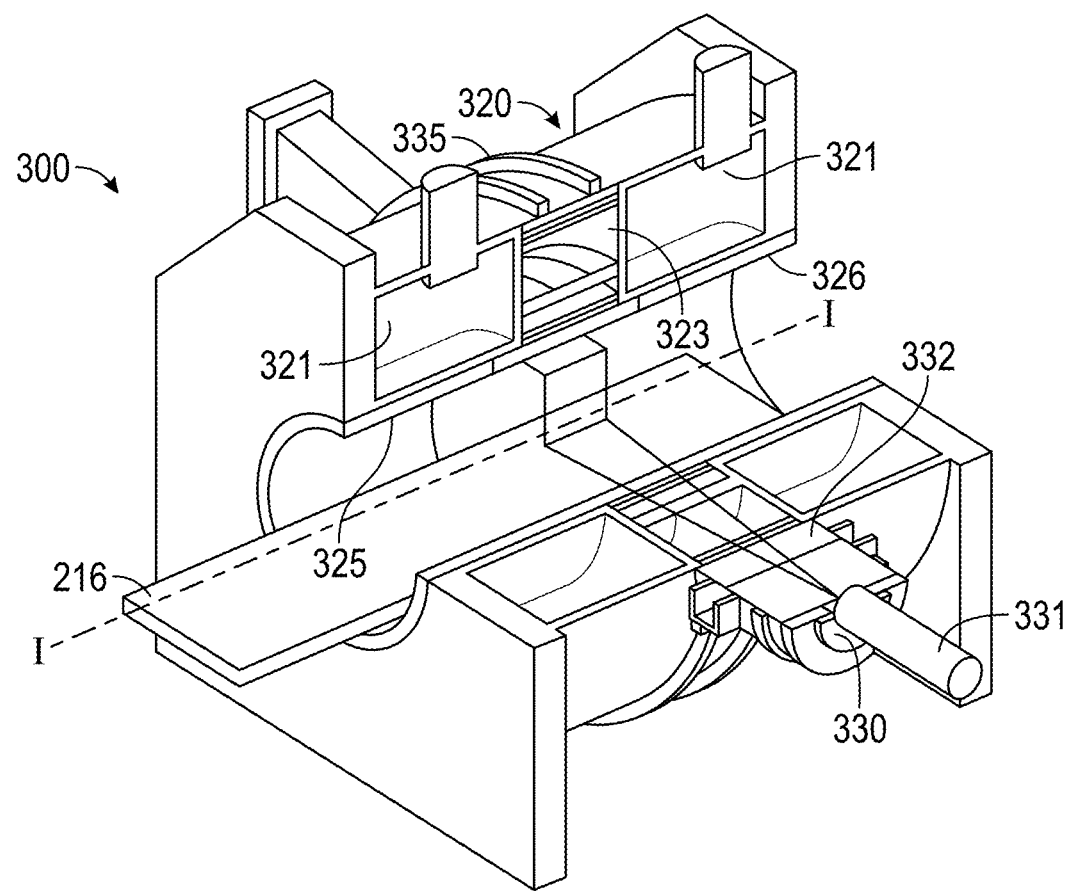
FIG. 3 illustrates a partially cut-away view of an example system including a combined radiation therapy system and an imaging system, such as a nuclear MR imaging (MM) system, according to some embodiments of the present disclosure.
Figure 4B:
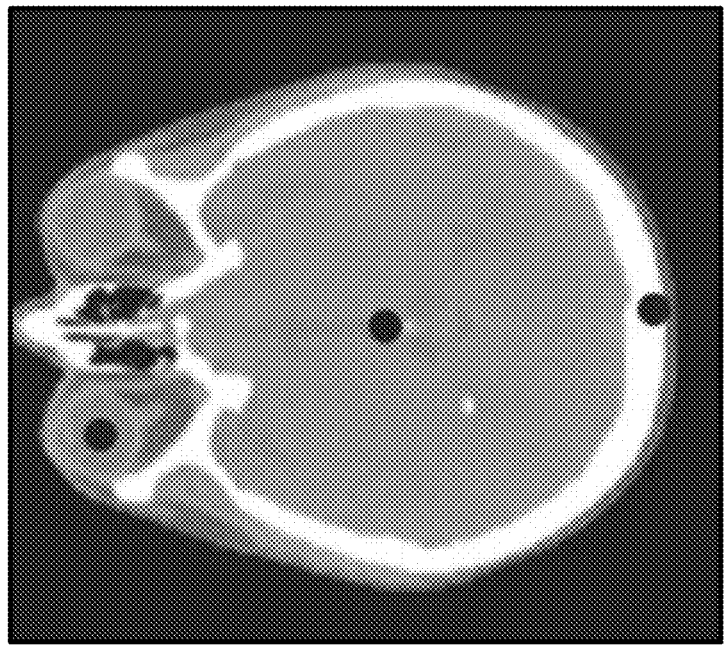
FIGS. 4A and 4B depict the differences between an example MRI image and a corresponding CT image, respectively, according to some embodiments of the present disclosure.
Figure 4A:
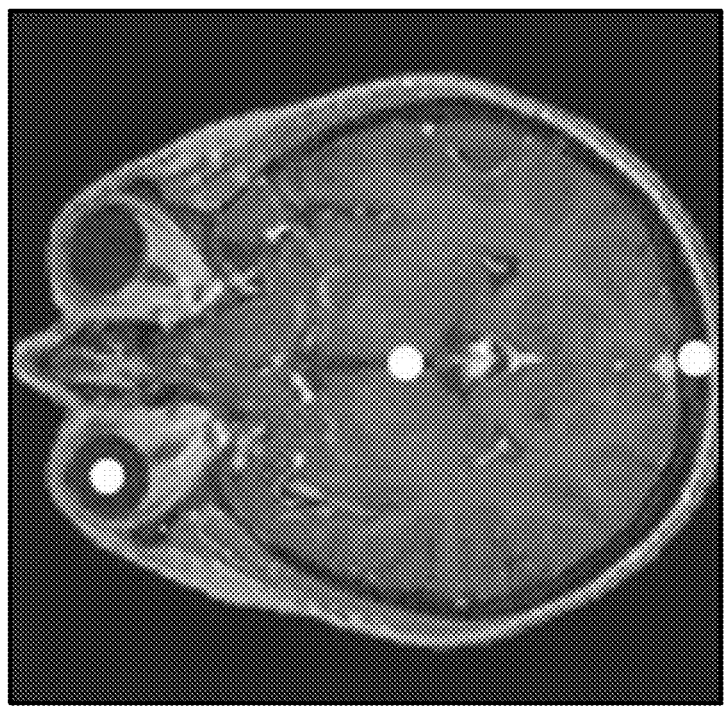

FIG. 3 depicts an example radiation therapy system 300 that may include combining a radiation therapy device 202 and an imaging system, such as a nuclear MR imaging system (e.g., known in the art as an MR-linac) consistent with the disclosed embodiments. As shown, system 300 may include a couch 216, an image acquisition device 320, and a radiation delivery device 330. System 300 delivers radiation therapy to a patient in accordance with a radiotherapy treatment plan. In some embodiments, image acquisition device 320 may correspond to image acquisition device 132 in FIG. 1 that may acquire origin images of a first modality (e.g., MRI image shown in FIG. 4A) or destination images of a second modality (e.g., CT image shown in FIG. 4B).

Couch 216 may support a patient (not shown) during a treatment session. In some implementations, couch 216 may move along a horizontal translation axis (labelled "I"), such that couch 216 may move the patient resting on couch 216 into and/or out of system 300. Couch 216 may also rotate around a central vertical axis of rotation, transverse to the translation axis. To allow such movement or rotation, couch 216 may have motors (not shown) enabling the couch 216 to move in various directions and to rotate along various axes. A controller (not shown) may control these movements or rotations in order to properly position the patient according to a treatment plan.

In some embodiments, image acquisition device 320 may include an MRI machine used to acquire 2D or 3D MRI images of the patient before, during, and/or after a treatment session. Image acquisition device 320 may include a magnet 321 for generating a primary magnetic field for magnetic resonance imaging. The magnetic field lines generated by operation of magnet 321 may run substantially parallel to the central translation axis I. Magnet 321 may include one or more coils with an axis that runs parallel to the translation axis I. In some embodiments, the one or more coils in magnet 321 may be spaced such that a central window 323 of magnet 321 is free of coils. In other embodiments, the coils in magnet 321 may be thin enough or of a reduced density such that they are substantially transparent to radiation of the wavelength generated by radiotherapy device 330. Image acquisition device 320 may also include one or more shielding coils, which may generate a magnetic field outside magnet 321 of approximately equal magnitude and opposite polarity in order to cancel or reduce any magnetic field outside of magnet 321. As described below, radiation source 331 of radiotherapy device 330 may be positioned in the region where the magnetic field is cancelled, at least to a first order, or reduced.

Image acquisition device 320 may also include two gradient coils 325 and 326, which may generate a gradient magnetic field that is superposed on the primary magnetic field. Coils 325 and 326 may generate a gradient in the resultant magnetic field that allows spatial encoding of the protons so that their position may be determined. Gradient coils 325 and 326 may be positioned around a common central axis with the magnet 321 and may be displaced along that central axis. The displacement may create a gap, or window, between coils 325 and 326. In embodiments where magnet 321 may also include a central window 323 between coils, the two windows may be aligned with each other.

In some embodiments, image acquisition device 320 may be an imaging device other than an MRI, such as an X-ray, a CT, a CBCT, a spiral CT, a PET, a SPECT, an optical tomography, a fluorescence imaging, ultrasound imaging, radiotherapy portal imaging device, or the like. As would be recognized by one of ordinary skill in the art, the above description of image acquisition device 320 concerns certain embodiments and is not intended to be limiting.

Radiotherapy device 330 may include the radiation source 331, such as an X-ray source or a linac, and an MLC 332 (shown below in FIG. 5). Radiotherapy device 330 may be mounted on a chassis 335. One or more chassis motors (not shown) may rotate chassis 335 around couch 216 when couch 216 is inserted into the treatment area. In an embodiment, chassis 335 may be continuously rotatable around couch 216 when couch 216 is inserted into the treatment area. Chassis 335 may also have an attached radiation detector (not shown), preferably located opposite to radiation source 331 and with the rotational axis of chassis 335 positioned between radiation source 331 and the detector. Further, device 330 may include control circuitry (not shown) used to control, for example, one or more of couch 216, image acquisition device 320, and radiotherapy device 330. The control circuitry of radiotherapy device 330 may be integrated within system 300 or remote from it.

During a radiotherapy treatment session, a patient may be positioned on couch 216. System 300 may then move couch 216 into the treatment area defined by magnet 321, coils 325 and 326, and chassis 335. Control circuitry may then control radiation source 331, MLC 332, and the chassis motor(s) to deliver radiation to the patient through the window between coils 325 and 326 according to a radiotherapy treatment plan.

FIG. 2A, FIG. 2B, and FIG. 3 illustrate generally embodiments of a radiation therapy device configured to provide radiotherapy treatment to a patient, including a configuration where a radiation therapy output may be rotated around a central axis (e.g., an axis "A"). Other radiation therapy output configurations may be used. For example, a radiation therapy output may be mounted to a robotic arm or manipulator having multiple degrees of freedom. In yet another embodiment, the therapy output may be fixed, such as located in a region laterally separated from the patient, and a platform supporting the patient may be used to align a radiation therapy isocenter with a specified target locus within the patient.

As discussed above, radiation therapy devices described by FIG. 2A, FIG. 2B, and FIG. 3 include an MLC for shaping, directing, or modulating an intensity of a radiation therapy beam to the specified target locus within the patient.

FIG. 5 illustrates an example of an MLC 332 that includes leaves 532A through 532J that may be automatically positioned to define an aperture approximating a tumor 540 cross section or projection. The leaves 532A through 532J permit modulation of the radiation therapy beam. The leaves 532A through 532J may be made of a material specified to attenuate or block the radiation beam in regions other than the aperture, in accordance with the radiation treatment plan. For example, the leaves 532A through 532J may include metallic plates, such as comprising tungsten, with a long axis of the plates oriented parallel to a beam direction and having ends oriented orthogonally to the beam direction (as shown in the plane of the illustration of FIG. 2A). A "state" of the MLC 332 may be adjusted adaptively during a course of radiation therapy treatment, such as to establish a therapy beam that better approximates a shape or location of the tumor 540 or another target locus. This is in comparison to using a static collimator configuration or as compared to using an MLC 332 configuration determined exclusively using an "offline" therapy planning technique. A radiation therapy technique using the MLC 332 to produce a specified radiation dose distribution to a tumor or to specific areas within a tumor may be referred to as IMRT.

Figure 6:
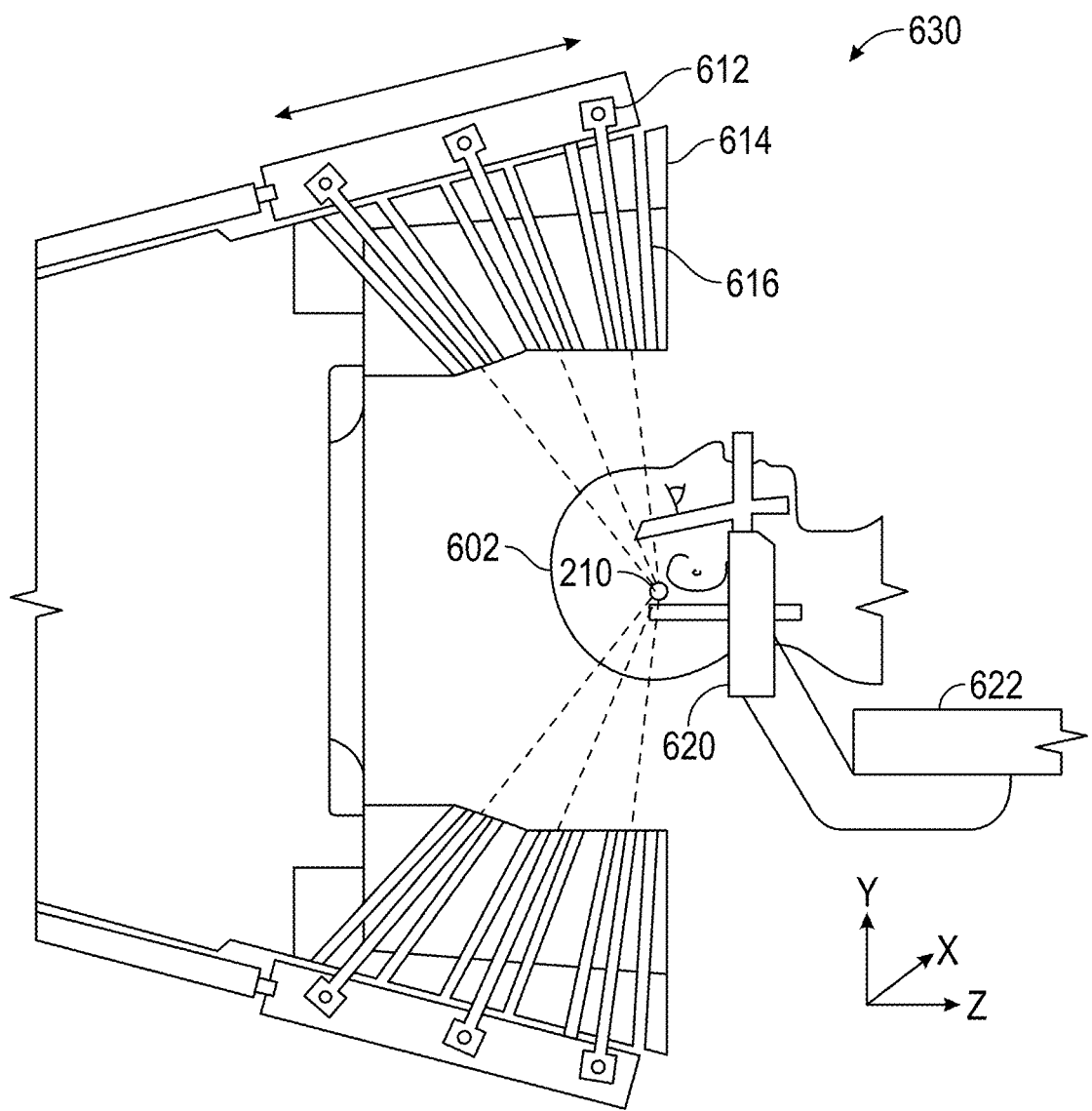
FIG. 6 illustrates an example of a Gamma Knife® radiation therapy system, according to some embodiments of the present disclosure.

FIG. 6 illustrates an embodiment of another type of radiotherapy device 630 (e.g., a Leksell Gamma Knife®), according to some embodiments of the present disclosure. As shown in FIG. 6, in a radiotherapy treatment session, a patient 602 may wear a coordinate frame 620 to keep stable the patient's body part (e.g., the head) undergoing surgery or radiotherapy. Coordinate frame 620 and a patient positioning system 622 may establish a spatial coordinate system, which may be used while imaging a patient or during radiation surgery. Radiotherapy device 630 may include a protective housing 614 to enclose a plurality of radiation sources 612. Radiation sources 612 may generate a plurality of radiation beams (e.g., beamlets) through beam channels 616. The plurality of radiation beams may be configured to focus on an isocenter 210 from different directions. While each individual radiation beam may have a relatively low intensity, isocenter 210 may receive a relatively high level of radiation when multiple doses from different radiation beams accumulate at isocenter 210. In certain embodiments, isocenter 210 may correspond to a target under surgery or treatment, such as a tumor.

After initial images of the target are acquired, the location and/or orientation of the target region may change. For example, the patient may shift during transfer to the treatment room, during movement within the treatment room (e.g., positioning on a couch, bed, or table), or during the administration of radiotherapy. For example, a patient may have voluntarily or involuntarily movements due to regular biological processes, including, e.g., breathing, swallowing, blinking, twitching, peristalsis, digestion, beating of the heart, coughing, passing gas, or other movements.

Additionally, tracking anatomy across different radiation therapy treatment sessions (also referred to as fractions) may be complicated, because a patient may lose or gain weight between each fraction, a target region (e.g., tumor) may change size (e.g., shrink or get larger), or the anatomy around the target region may affect the position of the target region (e.g., the volume of a patient's bladder may change across fractions, affecting the location of surrounding structures).

These fraction-to-fraction changes in the location and/or orientation of the target region may reduce the efficacy of radiotherapy. For example, if the actual orientation or location of the target region is different than the assumed orientation or location based on prior imaging and/or inaccurate alignment with prior imaging, then the correct dose of radiation may not be delivered to the intended target region. Additionally, surrounding healthy structures may receive radiation instead of, or in addition to, the intended target region. Exposing the wrong area to radiation may ultimately harm or kill surrounding healthy cells. Further, it may be desirable to match images of the patient's anatomical structures taken across fractions and/or to an original image taken of the patient to track the location of dose delivery and the overall dose delivered to the patient.

As mentioned above, the present inventors have recognized that dose-volume criteria may be equivalently expressed in terms of quantiles. This re-formulation of a dose-volume criteria allows incorporation of dose-volume criteria into a full optimization problem. Background information on quantiles is described below, followed by a description of computing sample quantiles via optimization, and then a detailed description of the invention.

The probability distribution of a real-valued random variable Y may be uniquely defined by its cumulative distribution function $F_Y: \mathbb{R} \to [0, 1]$ defined by Equation (1) below:

$$F_Y(y) = P(Y \leq y) = \tau, \tag{1}$$

In Equation (1), a given value $y$ corresponds to the $\tau$th quantile, and the inverse of the cumulative distribution function is called the quantile function, shown in Equation (2):

$$Q(\tau) = F_Y^{-1}(\tau) = \{ y \in \mathbb{R} : \tau = F_Y(y) \} \tag{2}$$

Specifically, $\tau = \frac{1}{2}$ corresponds to the median.

Another way to express the quantile function, which extends to more general cumulative distribution functions (not only the continuous and strictly monotonic ones) is shown in Equation (3):

$$Q(t) = \inf\{ y \in \mathbb{R} : t \leq F_Y(y) \} \tag{3}$$

This expression is useful if it is desirable to estimate a (sample) quantile from observations $y_1, \ldots, y_N$. If $F_Y$ is approximated as a step function that jumps up by $1/N$ at each of the N data points (the empirical CDF), the $\tau$th sample quantile may be efficiently computed by first sorting the observations and then extracting the observation with index given by rounding up $\tau N$.

It may seem that quantiles are inseparably linked to sorting the sample observations but, in fact, sorting merely correspond to a particular algorithm for solving a (simple) optimization problem. The sample mean $\mu$ may be defined as the solution to the problem of minimizing the expected squared loss, as shown in Equation (4):

$$\mu = \operatorname*{argmin}_u E_Y[(u - Y)^2] \approx \operatorname*{argmin}_u \frac{1}{N} \sum_{i=1}^{N} (u - y_i)^2. \tag{4}$$

Similarly, the sample quantile may be defined as the solution to the problem of minimizing an expectation of a piecewise linear loss $\rho_\tau(\cdot)$, as shown in Equation (5):

$$Q(\tau) = \operatorname*{argmin}_u E_Y[\rho_\tau(u - Y)] \approx \operatorname*{argmin}_u \frac{1}{N} \sum_{i=1}^{N} \rho_\tau(u - y_i) \tag{5}$$

where $$\rho_\tau(r) = \begin{cases} (\tau - 1)r, & r \leq 0 \\ \tau r, & r > 0 \end{cases}. \tag{6}$$

Equation (5) is equivalent to a linear program. Conveniently, optimization problems involving piecewise linear functions may be reformulated as linear programming problems, which may be solved very efficiently. Equation (5) is equivalent to Equation (7):

$$\underset{u,v,r}{\text{minimize}} \quad \frac{1}{N}\sum_{i=1}^{N} v_i \quad (7)$$

$$\text{subject to } v_i \geq (\tau - 1)r_i, \quad i = 1, \ldots, N,$$
$$v_i \geq \tau r_i, \quad i = 1, \ldots, N,$$
$$r_i = u - y_i, \quad i = 1, \ldots, N$$

Note that this optimization problem is parameterized by $y_i$ and $\tau$, which means that when programming, it may be wrapped in a function estimate_quantile that accepts two arguments, a scalar $\tau \in (0, 1)$ and a list $y=[y_1, \ldots, y_N]$, and returns the solution $u^*$.

Clinicians often use a set of DVHs to assess the quality of a treatment plan. Each structure may have its own DVH, which is a curve ($a$, $y$) where $a$ is the fraction of the structure's volume that receives a dose of at least $y$ Gray. Viewing the dose $\mathcal{Y}$ as a random variable, the DVH may be interpreted probabilistically as $(1-\tau, y)$.

$\mathcal{V}$ discards spatial information by performing a spatial aggregation operation and then creates the curve described above. In probabilistic language, the spatial aggregation step corresponds to marginalizing over the spatial position, as shown in Equation (8):

$$p(\mathcal{Y}|\chi) = \int p(\mathcal{Y}, r|\chi) dr = \int p(\mathcal{Y}|r, \chi) p(r) dr \quad (8)$$

This integral may be approximated, such as by using numerical integration with finite differences or using a stochastic method (e.g., various forms of Monte Carlo integration).

Simulating the dose in a given position with a given machine configuration, $p(y|r, x)$, is referred to as a dose calculation. In the current state of the art, this probability density is usually not tractable, and is instead replaced with one or several, possibly weighted, samples $y_1, \ldots, y_k$ from the distribution $p(y|r, x)$. Methods for generating such samples may thus be either deterministic, e.g., a convolution-based dose calculation, or stochastic, e.g., a Monte-Carlo dose calculation.

$\mathcal{A} : X \times V \to \mathbb{R}_+,$ $\mathcal{V}$ $\mathcal{Y}(r_i, \chi) = a(r_i)^T \chi$ where $a(r_i)$ is a dose deposition vector. If the dose deposition vectors $a_i$ are precalculated, they may be concatenated to create a dose deposition matrix $A$, such that the dose calculation in all voxels reduces to a matrix-vector multiplication $y = Ax$.

Dose-volume criteria may be in the form of upper or lower bounds on the dose-volume histogram. For instance, a lower dose-volume constraint, $D_s(\alpha: \mathcal{Y}) \geq y$ $D_s(\alpha: \mathcal{Y}) \leq y$ The present inventors have recognized that dose-volume criteria may equivalently be expressed in terms of quantiles. For instance, with conditioning on x implicitly understood:

$D_s(\alpha: \mathcal{Y}) \geq y$ $1 - P(Y \leq \mathcal{Y}) \geq \alpha Q(1-\alpha) \geq y$ $D_s(\alpha: \mathcal{Y}) \leq y$ $1 - P(Y \leq \mathcal{Y}) \leq \alpha Q(1-\alpha) \leq y$ The optimization-based formulation of quantiles, described above, may be applied $$Q(1 - \alpha) \geq y \quad (9)$$

$$y \leq \underset{u}{\arg\min} E_{Y|X}[\rho_{1-\alpha}(u - Y)].$$

Here, similar to the spatial aggregation by marginalization in Equation (8), there are multiple possibilities, both deterministic and stochastic, for how to evaluate the expectation E described by Equations (10) and (11):

$$E_{Y|X}[\rho_{1-\alpha}(u - Y)] = \int \rho_{1-\alpha}(u - Y) p(y | x) dy \quad (10)$$

$$= \int\int \rho_{1-\alpha}(u - Y) p(y | r, x) p(r) dr dy. \quad (11)$$

Each instance of a quantile regression criterion, such as that in Equation (9), is an optimization problem with its own set of optimization variables u, but is parameterized (through the conditioning) by the optimization variables x of another optimization problem, namely the radiotherapy problem. A system, such as the radiotherapy system 100 may discretize the quantile regression problem, such as in Equations (9)-(11) as a sum of a finite number of terms. In some examples, the discretization may include a deterministic method, such as numeric integration over a uniform grid of spatial positions in the patient. In other examples, a stochastic method, e.g., representative subsampling (such as described in U.S. Pat. No. 10,744,343) or a Monte Carlo method, such as importance sampling, may be used to randomly select a discrete set of spatial positions in the patient.

A general formulation of a radiotherapy optimization problem is shown below in Equation (12), which includes an objective function and at least one constraint function:

$$\underset{x,y}{\text{minimize}} \quad f_0(x) + \sum_{i=1}^{n_j} f_i(y) \quad (12)$$

$$\text{subject to } g_i(x, y) \leq b_i, \quad i = 1, \ldots, n_c,$$
$$y = Ax,$$
$$x \geq 0$$

$f_0(x)$ $f_i$ for $i = 1, \ldots, n_f$ $g_i(x, y)$ for $i = 1, \ldots, n_c$

Of particular interest is the case where at least one of the cost functions in the objective function or one of constraint functions encodes a dose-volume criterion using a quantile regression optimization problem. In such cases, the optimization problem in Equation (13) is a nested optimization problem, e.g., a bi-level optimization problem, because it includes an outer or upper optimization problem defining in terms of solutions to one or several inner or lower optimization problems parameterized by optimization variables from the outer problem. Using various techniques of this disclosure, at least one inner optimization problem is a quantile regression problem. An example of a nested optimization problem that may be used to implement various techniques of this disclosure is shown below in Equation (13):

$$\begin{aligned}
\underset{x,y,q}{\text{minimize}} \quad & \|x\|_1 + \frac{1}{|V_{target}|} \sum_{y \in V_{target}} (y - \underline{y})_-^2 + (q - \overline{y})_+^2 \quad (13) \\
\text{subject to} \quad & \underline{y} \leq \underset{u}{\text{argmin}} \frac{1}{|V_{target}|} \sum_{y \in V_{target}} \rho_{0.05}(u - y), \\
& q = \underset{u}{\text{argmin}} \frac{1}{|V_{OAR}|} \sum_{y \in V_{OAR}} \rho_{0.95}(u - y), \\
& y = Ax, \\
& x \geq 0
\end{aligned}$$

where the functions $(\cdot)+$ and $(\cdot)-$ denote, respectively, the positive and the negative part of the argument. Equation (13) includes a first radiotherapy optimization problem, e.g., an objective function:

$$\underset{x,y,q}{\text{minimize}} \|x\|_1 + \frac{1}{|V_{target}|} \sum_{y \in V_{target}} (y - \underline{y})_-^2 + (q - \overline{y})_+^2$$

and at least one second radiotherapy optimization problem, e.g., constraint functions:

$$\begin{aligned}
\text{subject to} \quad & \underline{y} \leq \underset{u}{\text{argmin}} \frac{1}{|V_{target}|} \sum_{y \in V_{target}} \rho_{0.05}(u - y), \\
& q = \underset{u}{\text{argmin}} \frac{1}{|V_{OAR}|} \sum_{y \in V_{OAR}} \rho_{0.95}(u - y), \\
& y = Ax, \\
& x \geq 0, \\
& \|x\|_1
\end{aligned}$$

$$\frac{1}{|V_{target}|} \sum_{y \in V_{target}} (y - \underline{y})_-^2$$

$$(q - \overline{y})_+^2$$

At least one of the constraint functions is a quantile regression problem:

$$q = \underset{u}{\text{argmin}} \frac{1}{|V_{OAR}|} \sum_{y \in V_{OAR}} \rho_{0.95}(u - y),$$

The solution to the quantile regression problem is then provided to the quantile regression term of the objective function. In some examples, the second optimization problems, e.g., the constraint functions, are convex. That is, the second optimization problems are equivalent to linear programming problems but are not necessarily solved using such a formulation. Equations (7) and (13) describe convex optimization problems.

Bi-level problems may be complicated to solve, and consequently different approaches have been developed for different contexts. One approach may be to replace the second optimization problems, e.g., inner optimization problems, with their first-order optimality conditions, such as the Karush-Kuhn-Tucker conditions.

As another example to reduce the complexity of solving bi-level problems, a variable splitting method, also known as a decomposition method, which is a divide-and-conquer method may solve the optimization problem by formulating multiple simpler problems that may be solved in a parallel or distributed fashion. One example of a variable splitting method is the alternating direction method of multipliers (ADMM). Variable splitting methods are often effective in optimization problems where the objective function is separable, i.e., decomposes into terms that are, at least partially, dependent on different subsets of the optimization variables. A system, such as the radiotherapy system 100 may process the first radiotherapy optimization problem and the second radiotherapy optimization problems by at least one of (i) replacing the second optimization problems with corresponding first-order optimality conditions and (ii) using a variable splitting technique.

Most conventional approaches are iterative, but it is possible to solve them approximately using a machine learning method that predicts the solution, or some intermediate result of the computation, as described in US patent application publication numbers US 2021/0020297 A1 and US 2021/0020296 A1, for example. Finally, since the quantile regression problems are convex optimization problems, a system may compute the gradient of the solution to the second optimization problems with respect to the parameters of the first optimization problem using implicit differentiation, such as automatic differentiation.

This means that the bi-level problem may also be solved using any first-order oracle solver, i.e., a solver that only requires pointwise evaluations of the constituent functions and their gradients.

Figure 7:
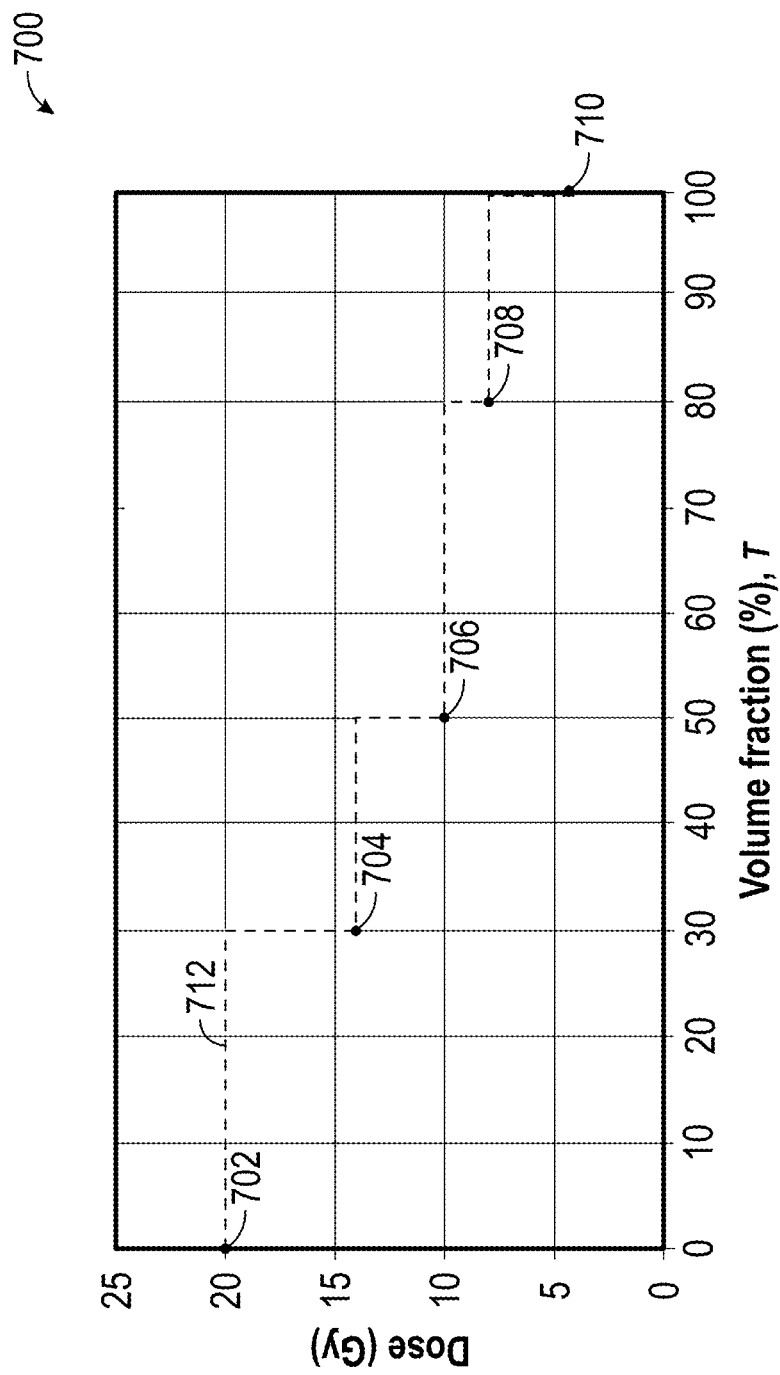
FIG. 7 is an example of a graph illustrating a plurality of DVH points.

FIG. 7 is an example of a graph illustrating a plurality of DVH points. The x-axis represents $\tau$, which is the volume fraction (%). The y-axis represents Gy, which is the radiation dose in Gray.

In general, DVH objectives consist of N pairs of values, $(\tau_i, D_i)$, i=1:N. In a structure, such as a target, organ at risk, or other sensitive volume, each pair expresses that a fraction $\tau$ of the volume should receive a dose of at most D Gray, such as shown in FIG. 7. A simple example is a single maximum dose objective on the entire organ, which is typical for the optical nerve, for example. Then the DVH point is simply (1, max dose).

In the case of a so-called parallel organ at risk in which the function may be maintained even though cells are killed in parts of the organ at risk, several points on the DVH are given. As an example, the whole liver dose may tolerate 18 Gy, but doses greater than 30 Gy should be confined to less than 30% of the liver target volume. In such a case the DVH points are (0,18), (0.3,30).

In the graph 700, there are five DVH points 702-710 having dosages for a corresponding volume. In treatment planning, the DVH should lie below the line 712 connecting the DVH points if the structure is an OAR and the DVH should lie above the line 712 if the structure is a target.

The techniques of this disclosure may approximate the stepwise function of FIG. 1 by applying an optimization-based formulation of quantiles to express dose-volume criterion as an inequality involving an optimization problem, which may improve DVH modeling and improve the delivery of radiation doses to a patient undergoing radiotherapy treatment. A system, such the radiotherapy system 100 in FIG. 1, may perform an optimization for each quantile that meets that constraint for that particular quantile as opposed to trying to optimize by approximating over the entire function, where you could exceed one of the constraints in the overall solution rather than meet all of the constraints from the control points. That is, instead of having an overall approximation or optimization goal, there are goals for each quantile. In some examples, if there are five control points, such as in FIG. 7, the system may solve five optimization problems concurrently, such as by using ADMM.

Each objective (r, D) may be defined using the minimization problem of Equation 14:

$$\min_D \sum_k \rho_\tau(d_k - D), \quad (14)$$

where the set $d_k$, k=1: nr vox in structure is the dose at each voxel in the structure. Here $\rho_\tau$ is the tilted absolute function. Solving Equation 14 yields the dose at quantile $\tau$ as its solution.

The above formulation translates the complicated mathematical ordering problem to determine the DVH point, into an optimization problem. Equation 14 may be re-formulated as a linear programming problem by using auxiliary variables.

Including DVH objectives in the optimization may be done by enforcing the DVH to below (or above) all the organ at risk (or tumor) DVH points. This may be formulated as Equation 15:

$$\operatorname*{argmin}_{\delta_i} \sum_k \rho_{\tau_i}(d_k - \delta_i) \leq D_i, i = 1 \ldots N \quad (15)$$

In Equation 15, the dose $d_k=(\varphi x)_k$, where $\varphi$ is the dose rate matrix from each degree of freedom to every relevant voxel for the Gamma Knife® and in brachytherapy and the beamlet fluence matrix for the Linac. In Gamma Knife® radiosurgery, x is the time for each sector, collimator state and isocenter.

Brachytherapy is a form of radiotherapy where a source of ionizing radiation is placed inside or next to the area requiring treatment. It usually involves placing radionuclides in or close to a target in order to deliver radiotherapy. These can be injected into the patient and left in place permanently while the radioactivity decays, or removed after treatment is complete. In brachytherapy x is the dwell time and dwell position for each radioactive seed and in radiotherapy it is the weight for each fluence beamlet. It should be noted that Equation 15 applies to an organ at risk; for a target the less than or equal to sign is replaced by a greater than sign.

A general optimization problem in radiosurgery or radiotherapy is given by Equation (16)

$$\min_{x \in \Omega} f(x) \quad (16)$$

The objective function f(x) may be a sum of terms enforcing coverage and selectivity of the planning dose as well as an efficient dose delivery. The feasible set $\Omega$ is often defined by constraint functions linear in x, i.e. $\Omega=\{x \in X: Ax \leq b\}$. Introducing DVH constraints in the optimization implies combining Equations 15 and 16 into the Equation (17):

$$\begin{cases} \min_x f(x) \\ Ax \leq b \\ \min_{\delta_i} \sum_k \rho_{\tau_i}((\varphi x)_k - \delta_i) \leq D_i, i = 1 \ldots N \end{cases} \quad (17)$$

Because this optimization problem contains another optimization problem in the constraints, it is a so-called nested optimization problem, e.g., bilevel optimization problem. This problem may be solved using, for instance, the alternating direction method of multipliers (ADMM). At each x iteration step, the third equation in Equation 17 should be solved. This part may be written as a set of update equations in $\delta$ and auxiliary variables.

This disclosure describes a radiotherapy treatment system that may apply optimization-based formulation of quantiles to express dose-volume criterion as an inequality involving an optimization problem, which may improve DVH modeling and improve the delivery of radiation doses to a patient undergoing radiotherapy treatment. A method for generating a radiotherapy treatment plan for a patient that may determine and solve a nested optimization problem, such as a bi-level optimization problem, which may include an outer optimization problem defined in terms of solutions to one or several inner optimization problems parameterized by optimization variables from the outer problem is described below with respect to FIG. 8.

Figure 8:
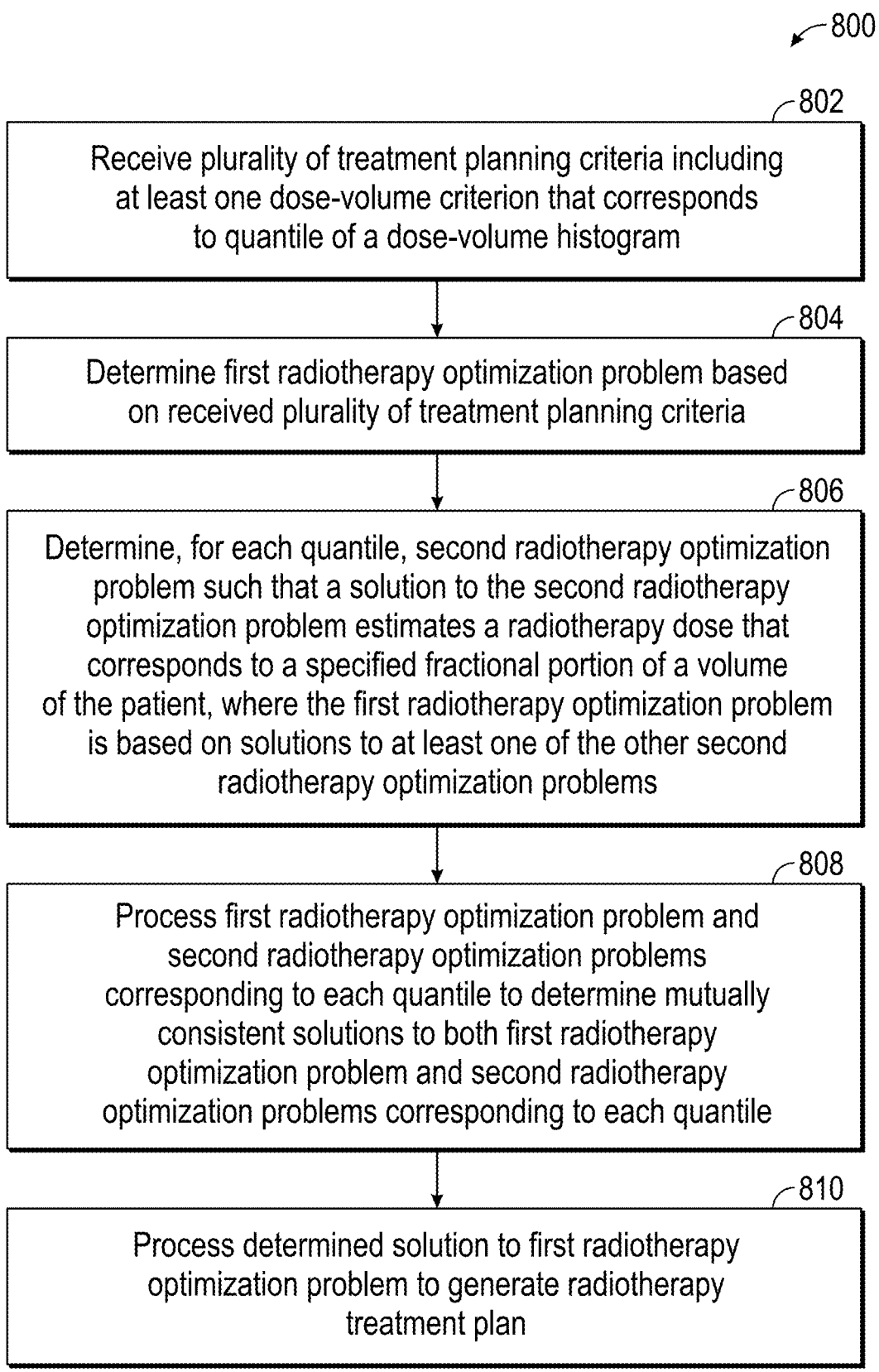
FIG. 8 illustrates a flow diagram of an example of a computer-implemented method for generating a radiotherapy treatment plan for a patient, according to some embodiments of the present disclosure.

FIG. 8 illustrates a flow diagram of an example of a computer-implemented method for generating a radiotherapy treatment plan for a patient, according to some embodiments of the present disclosure. The method 800 is represented as a set of blocks 802-810 that describe operations of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 8. The one or more processors may instruct other components of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation 802, a radiotherapy system, such as a processor of the radiotherapy system 100 shown in FIG. 1, may include receiving a plurality of treatment planning criteria including at least one dose-volume criterion that corresponds to a quantile of a dose-volume histogram. In some examples, the at least one dose-volume criterion corresponds to a target or an organ at risk. In some examples, the treatment delivery parameters comprise a set of isocenters used for delivery of the radiotherapy treatment plan.

For example, a processor of a system, such as the processor 114 of the radiotherapy system 100 of FIG. 1, may receive a plurality of treatment planning criteria including at least one dose-volume criterion that corresponds to a quantile of a dose-volume histogram. The dose-volume criterion may include a radiotherapy dose that corresponds to a specified fractional portion of a volume of the patient, e.g., a dose greater than 30 Gy should be confined to less than 30% of the target volume. Treatment planning criteria may include control points that correspond to quantile of the DVH, treatment delivery time, which may be desirable to reduce or minimize, and coverage of the target, which may be desirable to maximize.

At operation 804, the radiotherapy system may then determine a first radiotherapy optimization problem based on the received plurality of treatment planning criteria.

In some examples, the radiotherapy optimization problem can be formulated as a consensus problem, where each problem has its own local set of variables but that are forced to gradually reach consensus, i.e., a mutually consistent solution. This radiotherapy optimization problem can be solved in a distributed fashion using ADMM.

In some examples, a radiotherapy system can cycle through the radiotherapy optimization problem, solving or just performing a few iterations on each, before moving on to the next.

In some examples, the first radiotherapy optimization problem may be a bi-level radiotherapy optimization problem including an upper radiotherapy optimization problem and a lower radiotherapy optimization problem, where a solution to the lower radiotherapy optimization problem estimates the radiotherapy dose that corresponds to the specified fractional portion of the volume of the patient. The radiotherapy system may determine the upper optimization problem to be solved, such as by determining the upper optimization problem shown in Equation (13), which is an example of a quantile regression optimization problem.

In some examples, optimization variables of the upper radiotherapy optimization problem may include treatment delivery parameters, such as treatment delivery time, radiation doses, a set of isocenters used for delivery of the radiotherapy treatment plan, timing for delivery of the radiotherapy treatment plan, and a collimator sequence for the delivery of the radiotherapy treatment plan. In some examples, the system may compute the radiation doses based on a multiplication of a dose deposition matrix with a vector of the treatment delivery parameters.

At operation 806, the radiotherapy system may then determine, for each quantile, a second radiotherapy optimization problem such that a solution to the second radiotherapy optimization problem estimates a radiotherapy dose that corresponds to a specified fractional portion of a volume of the patient, where the first radiotherapy optimization problem is based on solutions to at least one of the other second radiotherapy optimization problems. That is, the radiotherapy system may determine, for each quantile, a corresponding inner optimization problem to be solved, such as by determining the inner optimization problem shown in Equation (13). Solutions to the inner optimization problems are provided to the outer optimization problem. In other words, the first radiotherapy optimization problem is based on solutions to at least one of the other second radiotherapy optimization problems.

A quantile regression subproblem, such as the inner optimization problems of Equation (13), is parameterized by the optimization variables of the outer optimization variables. The quantile regression subproblem takes some of the outer optimization variables as an input and solves the optimization problem with the outer optimization variables treated as constants.

The outer optimization problem, on the other hand, treats the quantile regression subproblems as functions whose values, and sometimes also gradients, may be evaluated. The outer optimization problem therefore depends on the solutions of the subproblems, where a solution is the value of the optimization variables at the optimum.

At operation 808, the radiotherapy system may then process the first radiotherapy optimization problem and the second radiotherapy optimization problems corresponding to each quantile to determine mutually consistent solutions to both the first radiotherapy optimization problem and the second radiotherapy optimization problems corresponding to each quantile. To be mutually consistent, solutions to the inner optimization problems, when applied to the outer optimization problem, solve the outer optimization problem.

In some examples, the second radiotherapy optimization problems may be processed independently of one another for speed improvement. In some examples, the radiotherapy system may concurrently process, e.g., such as but not limited to parallel processing, the second radiotherapy optimization problem for each quantile to determine the solution to the first radiotherapy optimization problem, such as by performing an alternating direction method of multipliers algorithm. In some examples, the second radiotherapy optimization problems may be solved in a distributed manner, such as by different computation nodes.

At operation 810, the radiotherapy system may process the determined solution to the first radiotherapy optimization problem to generate a radiotherapy treatment plan. In other words, once the radiotherapy system 100 has solved the outer optimization problem, the radiotherapy system 100 may generate a radiotherapy treatment plan.

The radiotherapy treatment plan generated at operation 810 need not be a deliverable radiotherapy treatment plan. For example, for linac systems, the optimization techniques of FIG. 8 may be performed during fluence optimization. Later, another optimization may be performed to make the radiotherapy treatment plan deliverable. In other words, the radiotherapy treatment plan may be made deliverable by using a post-processing step that may be performed after the optimization techniques shown in FIG. 8.

In some examples, the radiotherapy treatment plan generated at operation 810 may be provided with volumetric-modulated arc therapy (VMAT) or intensity modulated radiation therapy (IMRT). In some such examples, treatment delivery parameters may include a set of arc control points for one or more arcs, fluence fields, gantry speed, and dose rate along the one or more arcs.

In some examples, the method 800 may further include receiving input, e.g., user input, defining the at least one dose-volume criterion, such as dosages for a corresponding volume as in FIG. 7. As an example, the whole liver dose may tolerate 18 Gy, but doses greater than 30 Gy should be confined to less than 30% of the liver target volume.

The system, such as the radiotherapy system 100, may include a radiation therapy device, such as linac or MR-linac, configured to deliver a dose of radiation to an anatomical region of interest.

The treatment planning may be an iterative process, for example, in which a user provides input and hands off the optimization problem to a solver to perform various techniques in this disclosure to find a solution. The user may then evaluate the solution and repeat the process until a satisfactory treatment plan has been determined.

A computer-readable medium may include instructions that, when executed, cause one or more processors to perform the operations described with respect to FIG. 8, and other techniques described in this disclosure.

Figure 9:
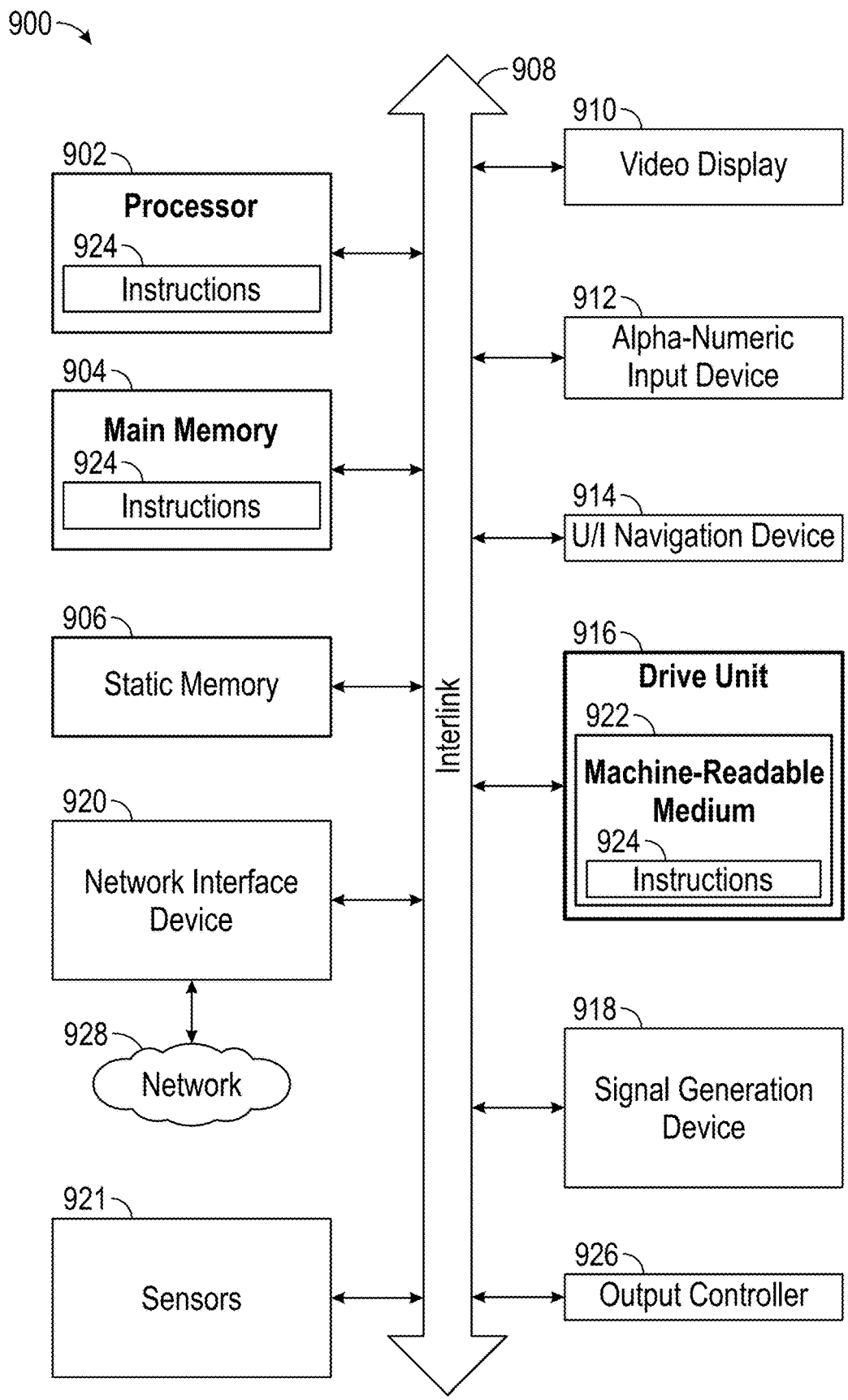
FIG. 9 illustrates an example of a block diagram of a machine on which one or more of the methods as discussed herein may be implemented.

FIG. 9 illustrates a block diagram of an embodiment of a machine 900 on which one or more of the methods as discussed herein may be implemented. In one or more embodiments, one or more items of the image processing device 112 may be implemented by the machine 900. In alternative embodiments, the machine 900 operates as a standalone device or may be connected (e.g., networked) to other machines. In one or more embodiments, the image processing device 112 may include one or more of the items of the machine 900. In a networked deployment, the machine 900 may operate in the capacity of a server or a client machine in server-client network environment, or as a peer machine in a peer-to-peer (or distributed) network environment. The machine 900 may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine 900 is illustrated, the term "machine" shall also be taken to include any collection of machines that individually or jointly execute a set (or multiple sets) of instructions to perform any one or more of the methodologies discussed herein.

The example machine 900 includes processing circuitry (e.g., the processor 902, a CPU, a GPU, an ASIC, circuitry, such as one or more transistors, resistors, capacitors, inductors, diodes, logic gates, multiplexers, buffers, modulators, demodulators, radios (e.g., transmit or receive radios or transceivers), sensors 921 (e.g., a transducer that converts one form of energy (e.g., light, heat, electrical, mechanical, or other energy) to another form of energy), or the like, or a combination thereof), a main memory 904 and a static memory 906, which communicate with each other via a bus 908. The machine 900 (e.g., computer system) may further include a video display unit 910 (e.g., a liquid crystal display (LCD) or a cathode ray tube (CRT)). The machine 900 also includes an alphanumeric input device 912 (e.g., a keyboard), a user interface (UI) navigation device 914 (e.g., a mouse), a disk drive or mass storage unit 916, a signal generation device 918 (e.g., a speaker), and a network interface device 920.

The disk drive or mass storage unit 916 includes a machine-readable medium 922 on which is stored one or more sets of data structures and instructions (e.g., software) 1124 embodying or utilized by any one or more of the methodologies or functions described herein. The instructions 924 may also reside, completely or at least partially, within the main memory 904 and/or within the processor 902 during execution thereof by the machine 900, the main memory 904 and the processor 902 also constituting machine-readable media.

The machine 900 as illustrated includes an output controller 926. The output controller 926 manages data flow to/from the machine 900. The output controller 926 is sometimes called a device controller, with software that directly interacts with the output controller 926 being called a device driver.

While the machine-readable medium 922 is shown in an embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), EEPROM, and flash memory devices; magnetic disks such as internal hard disks and removable disks; magneto-optical disks; and CD-ROM and DVD-ROM disks.

The instructions 924 may further be transmitted or received over a communications network 928 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

As used herein, "communicatively coupled between" means that the entities on either of the coupling must communicate through an item therebetween and that those entities cannot communicate with each other without communicating through the item.

Additional Notes

The above detailed description includes references to the accompanying drawings, which form a part of the detailed description. The drawings show, by way of illustration but not by way of limitation, specific embodiments in which the disclosure may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a," "an," "the," and "said" are used when introducing elements of aspects of the disclosure or in the embodiments thereof, as is common in patent documents, to include one or more than one or more of the elements, independent of any other instances or usages of "at least one" or "one or more." In this document, the term "or" is used to refer to a nonexclusive or, such that "A or B" includes "A but not B," "B but not A," and "A and B," unless otherwise indicated.

In the appended claims, the terms "including" and "in which" are used as the plain-English equivalents of the respective terms "comprising" and "wherein." Also, in the following claims, the terms "comprising," "including," and "having" are intended to be open-ended to mean that there may be additional elements other than the listed elements, such that elements after such a term (e.g., comprising, including, having) in a claim are still deemed to fall within the scope of that claim. Moreover, in the following claims, the terms "first," "second," and "third," and so forth, are used merely as labels, and are not intended to impose numerical requirements on their objects.

Embodiments of the disclosure may be implemented with computer-executable instructions. The computer-executable instructions (e.g., software code) may be organized into one or more computer-executable components or modules. Aspects of the disclosure may be implemented with any number and organization of such components or modules. For example, aspects of the disclosure are not limited to the specific computer-executable instructions, or the specific components or modules illustrated in the figures and described herein. Other embodiments of the disclosure may include different computer-executable instructions or components having more or less functionality than illustrated and described herein.

Method examples (e.g., operations and functions) described herein may be machine or computer-implemented at least in part (e.g., implemented as software code or instructions). Some examples may include a computer-readable medium or machine-readable medium encoded with instructions operable to configure an electronic device to perform methods as described in the above examples. An implementation of such methods may include software code, such as microcode, assembly language code, a higher-level language code, or the like (e.g., "source code"). Such software code may include computer-readable instructions for performing various methods (e.g., "object" or "executable code"). The software code may form portions of computer program products. Software implementations of the embodiments described herein may be provided via an article of manufacture with the code or instructions stored thereon, or via a method of operating a communication interface to send data via a communication interface (e.g., wirelessly, over the internet, via satellite communications, and the like).

Further, the software code may be tangibly stored on one or more volatile or non-volatile computer-readable storage media during execution or at other times. These computer-readable storage media may include any mechanism that stores information in a form accessible by a machine (e.g., computing device, electronic system, and the like), such as, but are not limited to, floppy disks, hard disks, removable magnetic disks, any form of magnetic disk storage media, CD-ROMS, magnetic-optical disks, removable optical disks (e.g., compact disks and digital video disks), flash memory devices, magnetic cassettes, memory cards or sticks (e.g., secure digital cards), RAMs (e.g., CMOS RAM and the like), recordable/non-recordable media (e.g., ROMs), EPROMS, EEPROMS, or any type of media suitable for storing electronic instructions, and the like. Such computer-readable storage medium coupled to a computer system bus may be accessible by the processor and other parts of the OIS.

In an embodiment, the computer-readable storage medium may have encoded a data structure for a treatment planning, wherein the treatment plan may be adaptive. The data structure for the computer-readable storage medium may be at least one of a Digital Imaging and Communications in Medicine (DICOM) format, an extended DICOM format, an XML format, and the like. DICOM is an international communications standard that defines the format used to transfer medical image-related data between various types of medical equipment. DICOM RT refers to the communication standards that are specific to radiation therapy.

In various embodiments of the disclosure, the method of creating a component or module may be implemented in software, hardware, or a combination thereof. The methods provided by various embodiments of the present disclosure, for example, may be implemented in software by using standard programming languages such as, for example, Compute Unified Device Architecture (CUDA), C, C++, Java, Python, and the like; and using standard machine learning/deep learning library (or API), such as tensorflow, torch and the like; and combinations thereof. As used herein, the terms "software" and "firmware" are interchangeable, and include any computer program stored in memory for execution by a computer.

A communication interface includes any mechanism that interfaces to any of a hardwired, wireless, optical, and the like, medium to communicate to another device, such as a memory bus interface, a processor bus interface, an Internet connection, a disk controller, and the like. The communication interface may be configured by providing configuration parameters and/or sending signals to prepare the communication interface to provide a data signal describing the software content. The communication interface may be accessed via one or more commands or signals sent to the communication interface.

The present disclosure also relates to a system for performing the operations herein. This system may be specially constructed for the required purposes, or it may comprise a general-purpose computer selectively activated or reconfigured by a computer program stored in the computer. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

In view of the above, it will be seen that the several objects of the disclosure are achieved, and other beneficial results attained. Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The above description is intended to be illustrative, and not restrictive. For example, the above-described examples (or one or more aspects thereof) may be used in combination with each other. In addition, many modifications may be made to adapt a particular situation or material to the teachings of the disclosure without departing from its scope. While the dimensions, types of materials and coatings described herein are intended to define the parameters of the disclosure, they are by no means limiting and are example embodiments. Many other embodiments will be apparent to those of skill in the art upon reviewing the above description. The scope of the disclosure should, therefore, be determined with reference to the appended claims, along with the full scope of equivalents to which such claims are entitled.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the disclosure should be determined with reference to the appended claims, along with the full scope of equivalents to which such claims are entitled. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

What is claimed is:

1. A computer-implemented method for generating a radiotherapy treatment plan for a patient, the method comprising:
   receiving, by processor circuitry, a plurality of treatment planning criteria including at least one dose-volume criterion that corresponds to a quantile of a dose-volume histogram;
   determining a first radiotherapy optimization problem based on the received plurality of treatment planning criteria;
   determining, for each quantile, a second radiotherapy optimization problem such that a solution to the second radiotherapy optimization problem estimates a radiotherapy dose that corresponds to a specified fractional portion of a volume of the patient, wherein the first radiotherapy optimization problem is processed based on solutions to at least one of the second radiotherapy optimization problems;
   processing the first radiotherapy optimization problem and the second radiotherapy optimization problems corresponding to each quantile to determine mutually consistent solutions to both the first radiotherapy optimization problem and the second radiotherapy optimization problems corresponding to each quantile; and
   processing the determined solutions to the first radiotherapy optimization problem to generate the radiotherapy treatment plan, wherein the radiotherapy treatment plan is used for delivering radiotherapy treatment to the patient for treatment of a tumor.

2. The computer-implemented method of claim 1, wherein the first radiotherapy optimization problem is a bilevel radiotherapy optimization problem including an upper radiotherapy optimization problem and a lower radiotherapy optimization problem, and wherein a solution to the lower radiotherapy optimization problem estimates the radiotherapy dose that corresponds to the specified fractional portion of the volume of the patient.

3. The computer-implemented method of claim 2, wherein the scope of the upper radiotherapy optimization problem includes treatment delivery parameters and radiation doses.

4. The computer-implemented method of claim 3, comprising:
   computing the radiation doses based on a multiplication of a dose deposition matrix with a vector of the treatment delivery parameters.

5. The computer-implemented method of claim 3, wherein the treatment delivery parameters comprise a set of isocenters used for delivery of the radiotherapy treatment plan.

6. The computer-implemented method of claim 2, wherein the first radiotherapy optimization problem includes an objective function and at least one constraint function.

7. The computer-implemented method of claim 6, wherein the at least one constraint function comprises a quantile regression problem.

8. The computer-implemented method of claim 7, comprising:
   discretizing the quantile regression problem as a sum of a finite number of terms.

9. The computer-implemented method of claim 6, wherein the objective function is a weighted sum of terms reflecting treatment complexity and dose-based criteria.

10. The computer-implemented method of claim 2, wherein the second optimization problems are convex.

11. The computer-implemented method of claim 10, wherein the set of treatment delivery parameters further comprises timing for delivery of the radiotherapy treatment plan and a collimator sequence for the delivery of the radiotherapy treatment plan.

12. The computer-implemented method of claim 10, wherein the set of treatment delivery parameters further comprises dwell times and dwell positions for delivery of the radiotherapy treatment plan.

13. The computer-implemented method of claim 1, comprising:
   receiving input defining the at least one dose-volume criterion.

14. The computer-implemented method of claim 1, wherein processing the first radiotherapy optimization problem and the second radiotherapy optimization problems comprises at least one of (i) replacing the second optimization problems with corresponding first-order optimality conditions and (ii) using a variable splitting technique.

15. The computer-implemented method of claim 1, wherein processing the first radiotherapy optimization problem and the second radiotherapy optimization problems corresponding to each quantile to determine mutually consistent solutions to both the first radiotherapy optimization problem and the second radiotherapy optimization problems corresponding to each quantile includes:
   concurrently processing the second radiotherapy optimization problem for each quantile to determine the solution to the first radiotherapy optimization problem.

16. The computer-implemented method of claim 15, wherein concurrently processing the second radiotherapy optimization problem for each quantile to determine the solution to the first radiotherapy optimization problem includes:
   concurrently processing the second radiotherapy optimization problem for each quantile to determine the solution to the first radiotherapy optimization problem by performing an alternating direction method of multipliers algorithm.

17. The computer-implemented method of claim 1, wherein the at least one dose-volume criterion corresponds to a target or an organ at risk.

18. The computer-implemented method of claim 1, wherein processing the first radiotherapy optimization problem and the second radiotherapy optimization problems corresponding to each quantile to determine mutually consistent solutions to both the first radiotherapy optimization problem and the second radiotherapy optimization problems corresponding to each quantile comprises:

computing a gradient using automatic differentiation.

19. A radiotherapy system for generating a radiotherapy treatment plan for a patient, the radiotherapy system comprising:

a radiation therapy device configured to deliver a dose of radiation to an anatomical region of interest; and a processor configured to:

receive a plurality of treatment planning criteria including at least one dose-volume criterion that corresponds to a quantile of a dose-volume histogram;

determine a first radiotherapy optimization problem based on the received plurality of treatment planning criteria;

determine, for each quantile, a second radiotherapy optimization problem such that a solution to the second radiotherapy optimization problem estimates a radiotherapy dose that corresponds to a specified fractional portion of a volume of the patient, wherein the first radiotherapy optimization problem is processed based on solutions to at least one of the other second radiotherapy optimization problems;

process the first radiotherapy optimization problem and the second radiotherapy optimization problems corresponding to each quantile to determine mutually consistent solutions to both the first radiotherapy optimization problem and the second radiotherapy optimization problems corresponding to each quantile; and process the determined solution to the first radiotherapy optimization problem to generate the radiotherapy treatment plan.

20. The radiotherapy system of claim 19, wherein the first radiotherapy optimization problem is a bilevel radiotherapy optimization problem including an upper radiotherapy optimization problem and a lower radiotherapy optimization problem, and wherein a solution to the lower radiotherapy optimization problem estimates the radiotherapy dose that corresponds to the specified fractional portion of the volume of the patient.

21. The radiotherapy system of claim 20, wherein a scope of the upper radiotherapy optimization problem includes treatment delivery parameters and radiation doses.

22. The radiotherapy system of claim 19, wherein the radiation therapy device includes a linear accelerator (linac) or magnetic resonance (MR)-linac.

23. The radiotherapy system of claim 22, wherein the radiotherapy treatment plan is to be provided with volumetric-modulated arc therapy (VMAT) or intensity modulated radiation therapy (IMRT), and wherein treatment delivery parameters comprise:

a set of arc control points for one or more arcs, fluence fields, gantry speed, and dose rate along the one or more arcs.

24. A non-transitory computer-readable medium configured to include instructions that, when executed, cause one or more processors to:

receive a plurality of treatment planning criteria including at least one dose-volume criterion that corresponds to a quantile of a dose-volume histogram;

determine a first radiotherapy optimization problem based on the received plurality of treatment planning criteria;

determine, for each quantile, a second radiotherapy optimization problem such that a solution to the second radiotherapy optimization problem estimates a radiotherapy dose that corresponds to a specified fractional portion of a volume of a patient, wherein the first radiotherapy optimization problem is processed based on solutions to at least one of the other second radiotherapy optimization problems;

process the first radiotherapy optimization problem and the second radiotherapy optimization problems corresponding to each quantile to determine mutually consistent solutions to both the first radiotherapy optimization problem and the second radiotherapy optimization problems corresponding to each quantile; and process the determined solution to the first radiotherapy optimization problem to generate the radiotherapy treatment plan, wherein the radiotherapy treatment plan is used for delivering radiotherapy treatment to the patient.

25. The non-transitory computer-readable medium of claim 24, wherein the first radiotherapy optimization problem is a bilevel radiotherapy optimization problem including an upper radiotherapy optimization problem and a lower radiotherapy optimization problem, and wherein a solution to the lower radiotherapy optimization problem estimates the radiotherapy dose that corresponds to the specified fractional portion of the volume of the patient for treatment of a tumor.

26. The non-transitory computer-readable medium of claim 25, wherein a scope of the upper radiotherapy optimization problem includes treatment delivery parameters and radiation doses.

* * * * *

UNITED STATES PATENT AND TRADEMARK OFFICE
CERTIFICATE OF CORRECTION

| | | |
|---|---|---|
| PATENT NO. | : 12,458,815 B2 | Page 1 of 1 |
| APPLICATION NO. | : 17/651679 | |
| DATED | : November 4, 2025 | |
| INVENTOR(S) | : Sjolund et al. | |

It is certified that error appears in the above-identified patent and that said Letters Patent is hereby corrected as shown below:

In the Specification

In Column 35, Line 21, in Claim 19, after "of the", delete "other"

In Column 36, Line 21, in Claim 24, after "of the", delete "other"

In Column 36, Line 34, in Claim 24, delete "patient." and insert --patient for treatment of a tumor.-- therefor In Column 36, Lines 42-43, in Claim 25, delete "patient for treatment of a tumor." and insert --patient.-- therefor Signed and Sealed this
Third Day of February, 2026

John A. Squires
*Director of the United States Patent and Trademark Office*